United States Patent
Walker et al.

(10) Patent No.: US 7,949,498 B2
(45) Date of Patent: May 24, 2011

(54) METHOD, SYSTEM AND COMPUTER PROGRAM PRODUCT FOR REGISTRATION OF MULTI-DIMENSIONAL DATASETS

(75) Inventors: William F. Walker, Barboursville, VA (US); Francesco Viola, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 619 days.

(21) Appl. No.: 11/906,614

(22) Filed: Oct. 2, 2007

(65) Prior Publication Data

US 2008/0091678 A1    Apr. 17, 2008

Related U.S. Application Data

(60) Provisional application No. 60/848,821, filed on Oct. 2, 2006, provisional application No. 60/923,881, filed on Apr. 17, 2007.

(51) Int. Cl.
*G06F 17/30* (2006.01)

(52) U.S. Cl. ........ 702/189; 345/606; 345/648; 345/649; 382/128; 382/294; 382/275; 382/278

(58) Field of Classification Search .................. 702/189; 345/606, 648, 649; 382/107, 128, 294, 275, 382/278, 280, 295, 296, 300
See application file for complete search history.

(56) References Cited

U.S. PATENT DOCUMENTS

| | | |
|---|---|---|
| 5,205,159 A | 4/1993 | Carr et al. |
| 5,273,517 A | 12/1993 | Barone et al. |
| 5,311,908 A | 5/1994 | Barone et al. |
| 5,854,423 A | 12/1998 | Venegas |
| 5,921,928 A | 7/1999 | Greenleaf et al. |
| 6,083,159 A | 7/2000 | Driscoll et al. |
| 6,135,957 A | 10/2000 | Cohen et al. |
| 6,178,271 B1 * | 1/2001 | Maas, III ...................... 382/294 |
| 6,402,704 B1 | 6/2002 | McMorrow |
| 6,508,768 B1 | 1/2003 | Hall et al. |
| 6,537,819 B2 | 3/2003 | Cohen et al. |
| 6,573,104 B2 | 6/2003 | Carr et al. |
| 6,613,573 B1 | 9/2003 | Cohen |
| 6,632,678 B2 | 10/2003 | Aiken et al. |
| 6,687,422 B1 * | 2/2004 | Chen et al. .................... 382/300 |
| 6,738,532 B1 * | 5/2004 | Oldroyd ........................ 382/294 |
| 6,764,448 B2 | 7/2004 | Trahey et al. |
| 6,787,363 B2 | 9/2004 | Cohen et al. |
| 6,797,519 B2 | 9/2004 | Cohen et al. |
| 6,890,299 B2 | 5/2005 | Cohen et al. |
| 6,951,544 B2 | 10/2005 | Trahey et al. |

(Continued)

OTHER PUBLICATIONS

Alam et al., An Adaptive Strain Estimator for Elastography . vol. 45, No. 2, Mar. 1998, pp. 461-472.

(Continued)

*Primary Examiner* — Carol S Tsai
(74) *Attorney, Agent, or Firm* — Schwegman, Lundberg & Woessner, P.A.

(57) ABSTRACT

Methods, systems and computer program products for estimating changes in an object represented by first and second multidimensional datasets. The first dataset is a reference dataset and the second dataset is an altered dataset. Discrete data samples of the first dataset are processed to form a piecewise continuous representation thereof. An error function is computed for comparisons between discrete data samples in the second dataset and the piecewise continuous representation of the first dataset. An alteration of the second dataset relative to the first dataset that minimizes the error function is determined.

22 Claims, 20 Drawing Sheets

U.S. PATENT DOCUMENTS

| | | | |
|---|---|---|---|
| 7,179,652 | B2 | 2/2007 | Cohen et al. |
| 7,192,726 | B1 | 3/2007 | Carr et al. |
| 7,202,048 | B2 | 4/2007 | Carr, Jr. |
| 7,207,939 | B2 | 4/2007 | Husher |
| 7,261,861 | B2 | 8/2007 | Kautzky |
| 7,349,583 | B2 * | 3/2008 | Kumar et al. ............... 382/294 |
| 7,374,538 | B2 | 5/2008 | Nightingale et al. |
| 7,399,637 | B2 | 7/2008 | Wright et al. |
| 7,422,905 | B2 | 9/2008 | Clague et al. |
| 7,439,069 | B2 | 10/2008 | Nippoldt et al. |
| 7,524,670 | B2 | 4/2009 | Cohen et al. |
| 2003/0068097 | A1 * | 4/2003 | Wilson et al. ............... 382/276 |
| 2005/0004463 | A1 * | 1/2005 | Chen et al. |
| 2005/0140670 | A1 * | 6/2005 | Wu et al. ..................... 345/419 |
| 2007/0038095 | A1 * | 2/2007 | Greenleaf et al. |
| 2007/0184508 | A1 * | 8/2007 | Cohen et al. |
| 2008/0038828 | A1 * | 2/2008 | Cohen et al. |
| 2008/0049994 | A1 * | 2/2008 | Rognin et al. ............... 382/128 |
| 2008/0249408 | A1 * | 10/2008 | Palmeri et al. |
| 2009/0112483 | A1 * | 4/2009 | Cohen |

OTHER PUBLICATIONS

Bohs et al., Ensemble Tracking for 2D Vector Velocity Measurement: Experemental and Initial Clinical Results. vol. 45, No. 4, Jul. 1998, pp. 912-924.

Bohs et al. A Real Time System for Quantifying and Displaying Two-Dimensional Velocities using Ultrasound. vol. 19, No. 9, Jul. 1993, pp. 751-761.

Bonnefous et al., Time Domain Formulation of Pulse-Doppler Ultrasound and Blood Velocity Estimation by Cross Correlation. Ultrasonic Imaging 8, 1986, pp. 73-85.

Cespedes et al. Methods for Estimation of Subsample Time Delays of Digitized Echo Signals. Ultrasonic Imaging 17, 1995, pp. 142-171.

Chaturvedi et al., 2-D Companding for Noise Reduction in Strain Imaging. vol. 45, Jan. 1998, pp. 179-191.

Embree et al., Volumetric Blood Flow via Tme-Domain Correlation: Experimental Verification. vol. 37, No. 2. May 1990, pp. 176-189.

Fertner et al., Comparison of Various Time Delay Estimation Methods by Computer Simulation. vol. ASSP-34, No. 5, Oct. 1986, pp. 1329-1330.

Flax et al., Phase-Aberration Correction Using Signals From Point Reflectors and Diffuse Scatterers: Basic Principles. vol. 35, No. 6, Nov. 1988, pp. 758-767.

Friemel et al., Relative Performance of Two-Dimensional Speckle-Tracking Techniques: Normalized Correction, Non-Normalized Correction and Sum-Absolute-Difference. 1995, pp. 8481-1484.

Geiman et al., A Novel interpolation strategy for estimation speckle motion. Biol. 45, 2000, pp. 1541-1552.

Geiman et al. A Comparison of Algorithms for Tracking Sub-pixel Speckle Motion. 1997, pp. 1239-1242.

Giunta et al., Fine Estimators of Two-Dimensional Parameters and Application to Spatial Shift Estimation. vol. 47, No. 12, Dec. 1999, pp. 3201-3207.

Jacovitti et al., Discrete Time Techniques for Time Delay Estimation. vol. 41, No. 2, Feb. 1993, pp. 525-533.

Langeland et al., A Simulation Study on the Performance of Different Estimators for Two-Dimensional Velocity Estimation. 2002, pp. 1859-1862.

Manocha., Solving Systems of Polynomial Equations. Mar. 1994, pp. 46-55.

Negron et al., Development and Characterization of a Vitreous Mimicking Material for Radiation Force Imaging. vol. 49, No. 11, Nov. 2002, pp. 1543-1551.

Ng et al., A Comparative Evaluation of Several Algorithms for Phase Aberration Correction. vol. 41, No. 5, Sep. 1994. pp. 631-643.

Ophir et al., Elastography: A Quantitative Method for Imaging the Elasticity of Biological Tissues. Ultrasonic Imaging 13, 1991, pp. 111-134.

Pinton et al., Continuous Delay estimation with Polynomial Splines. vol. 53, No. 11, Nov. 2006, pp. 2026-2035.

Sumino., Measurements of Ultrasonic pulse arrival time differences produced by abdominal Wall specimens. Dec. 1991, pp. 2924-2930.

Thevenaz et al., A Pyramid Approach to Subpixel Registration Based on Intensity. vol. 7, No. 1, Jan. 1998, pp. 27-41.

Torp et al., Comparison Between Cross-Correlation and Auto-Correlation Technique in Color Flow Imaging. 1993, pp. 1039-1042.

Trahey et al., Synthetic Receive Aperture Imaging with Phase Correction for Motion and for Tissue Inhomogeneities—Part II: Effects of and Correction for Motion. vol. 39, No. 4. Jul. 1992. pp. 496-501.

Viola et al., A comparison of the performance of time-delay estimators in medical ultrasound, IEEE Transactions on Ultrasonics Ferroelectrics & Frequency Control, vol. 50, No. 4, Jun. 2003, pp. 392-401.

Viola et al., Radiation Force Imaging of Viscoelastic Properties with Reduce Artifacts, vol. 50, No. 6 Jun. 2003, pp. 736-742.

Viola et al., Efficient and Accurate Spline-Based Time Delay Estimation . 2004. pp. 870-873.

Viola et al., A Spline-Based Algoritham for Continuous Time-Delay Estimation Using Sampled Data. vol. 52, No. 1, Jan. 2005, pp. 80-93.

Walker, et al., A Fundamental Limit on the Performance of Correlation Based Phase Correction and Flow Estimation Techniques. vol. 41, No. 5, Sep. 1994, pp. 644-654.

Walker et al., A Method of Imaging Viscoelastic Parameters with Acoustic Radiation Force. vol. 45, 2000, pp. 1437-1447.

Walker et al., A Fundamental Limit on Delay Estimation Using Partially Correlated Speckle Signals. IEEE Transactions on Ultrasonics, Ferroelectrics and Frequency Control, vol. 42, No. 2, 1995, pp. 301-308.

Walker et al., A Novel Spline-Based Algorithm for Multidimensional Displacement and Strain Estimation. 2006, pp. 1221-1225.

Weng et al., US Extended—Field-of-View Imaging Technology. vol. 203, No. 3, Jun. 1997, 877-880.

* cited by examiner

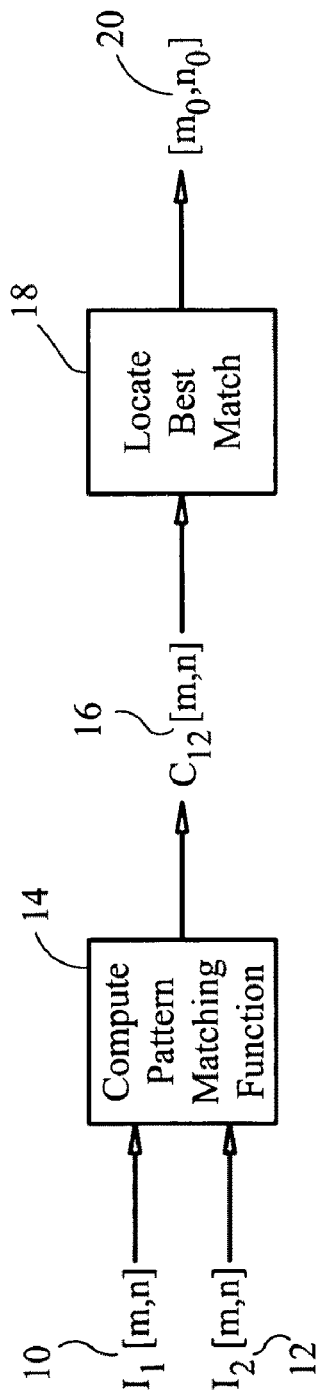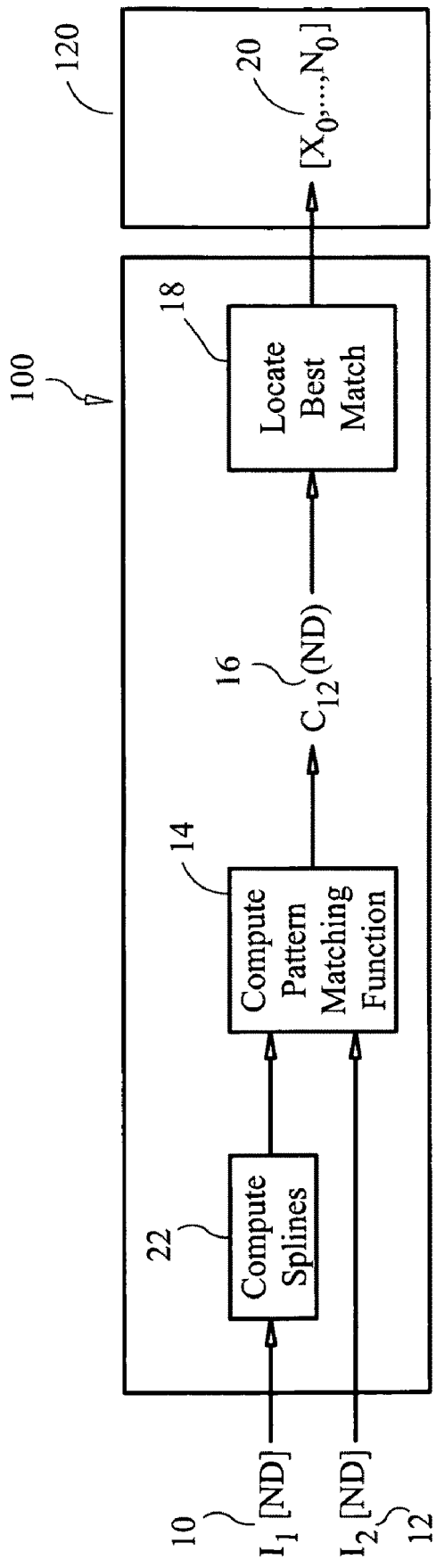

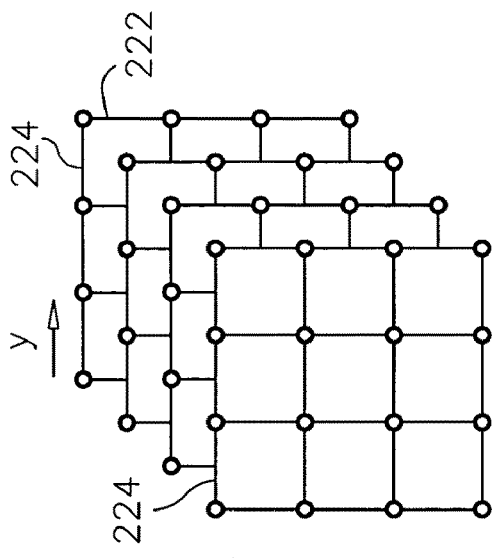
FIG. 6C
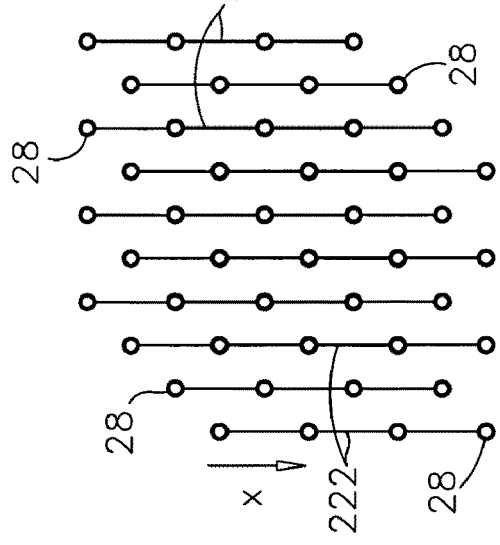
FIG. 6B
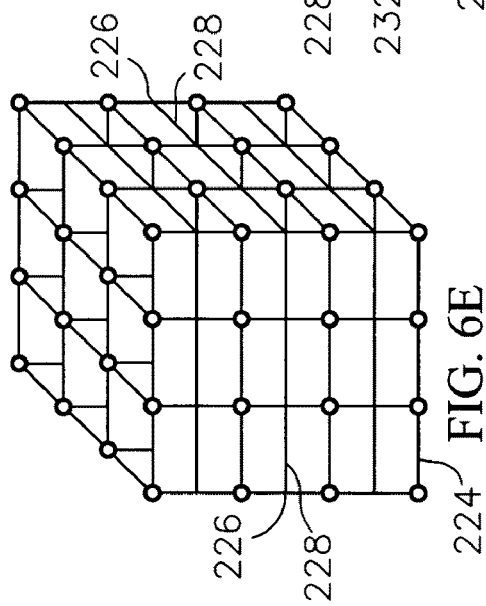
FIG. 6F
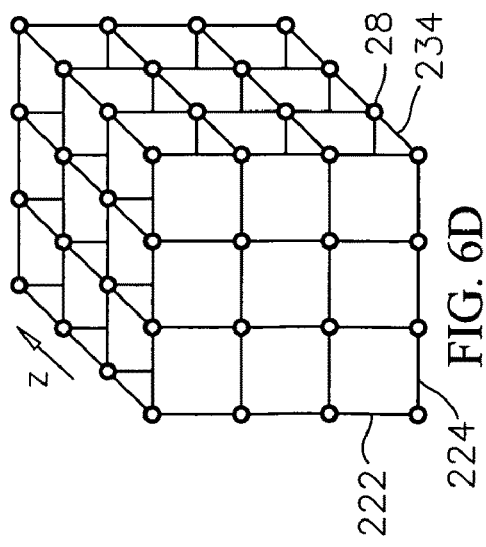
FIG. 6E
FIG. 6A
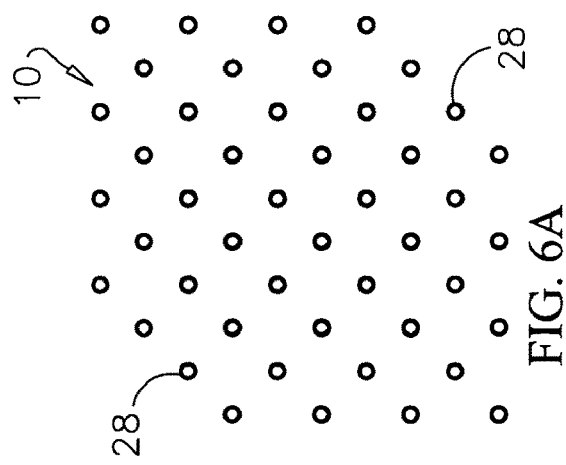
FIG. 6D

METHOD, SYSTEM AND COMPUTER PROGRAM PRODUCT FOR REGISTRATION OF MULTI-DIMENSIONAL DATASETS

CROSS-REFERENCE

This application claims the benefit of U.S. Provisional Application No. 60/848,821, filed Oct. 2, 2006 and this application also claims the benefit of U.S. Provisional Application No. 60/923,881, filed Apr. 17, 2007, both of which provisional applications are hereby incorporated herein, in their entireties by reference thereto, and to which priority is claimed under 35 U.S.C. Section 119.

GOVERNMENT RIGHTS

This invention was made with government support under US Army CDMRP Grant W81XWH-04-1-590 and under Grant R01 EB005433 from awarded by NIBIB and the National Institutes of Health. The United States Government may have certain rights in this invention.

FIELD OF THE INVENTION

The present invention relates to the field of signal processing. More particularly the present invention relates to motion estimation or image registration.

BACKGROUND OF THE INVENTION

Motion estimation is critical to many modern signal-processing algorithms. Motion estimation or image registration plays a central role in a broad range of signal processing fields, including, but not limited to RADAR, SONAR, light microscopy and medical imaging. In medical ultrasound, a few well-known applications include extended field of view imaging, estimation of blood and tissue motion, and estimation of radiation force or mechanically induced displacements for elasticity imaging. Because of its central significance, estimator accuracy, precision, and computational cost are of critical importance to these and numerous other applications. The effort spent in this area is reflected in the variety of algorithms that have been developed.

While cross-correlation and similar pattern matching techniques developed for continuous signals can be readily applied to sampled, real-world data, these approaches are limited to motion estimates that are multiples of the sample distance. Various strategies have been developed in an attempt to circumvent this limitation. One approach is to interpolate the raw sampled data to a finer sampling rate. Unfortunately this approach retains the same problem, albeit at a smaller sample size. Further, this dramatically increases the computational cost of motion tracking.

Another strategy is to interpolate the pattern-matching grid, either at a higher sampling rate, or using an analytical function. This approach typically retains a high bias. Another widely referenced approach is the "grid slopes" algorithm as referred to in Geiman et al., in "A Comparison of Algorithms for Tracking Sub-pixel Speckle Motion", IEEE Ultrasonic Symposium, pp. 1239-1242, 1997 and Bohs et al. in "Ensemble Tracking for 2D Vector Velocity Measurement: Experimental and Initial clinical Results", IEEE Trans. Ultrason., Ferroelect., Freq. cont., vol. 45, no. 4, pp. 912-924, 1998.

Each of these algorithms can be applied to reduce systematic errors in motion estimation, however each entails an increased computational cost and significant bias errors.

Spline-based image registration has also been described in the literature, however published techniques are limited by the use of a separable spline model, and by a lack of quantification of intrinsic bias errors, e.g., see Thevanez et al., "A Pyramid Approach to Subpixel Registration Based on Intensity", IEEE Transactions on Image Processing, vol. 7, pp. 27-41, 1998.

Viola et al., "A Novel Spline-Based Algorithm for Continuous Time-Delay Estimation Using Sampled Data", IEEE. Trans. Ultrasonics Ferroelectrics & Frequency Control, Vol. 52, pp. 80-93, 2005, which is incorporated herein, in its entirety, by reference thereto, describes a one-dimensional displacement estimator, but not a multidimensional estimator. Although Viola et al. indicates that it is generally straight-forward, the straight-forward approach requires solving a very large number of simultaneous equations, which is too costly in terms of the memory and computing power required, to be practically useful in most applications.

It has been shown that the performance of tissue elasticity imaging can be significantly improved by the application of 2D companding, but the computational burden of this technique has limited its application.

There is a continuing need for methods, systems and algorithms for motion estimation applications that provide precise estimation of sub-sample displacements without undue computational cost. The present invention provides solutions that can produce estimation of multi-dimensional sub-sample displacements that have a better precision and accuracy than currently existing methods. Furthermore, it would be desirable to estimate more complex deformations with better precision and accuracy.

Systems, methods and algorithms capable of calculating displacement estimates having errors that are less than the distance between two consecutive samples and less than those of existing algorithms would also be desirable.

SUMMARY OF THE INVENTION

The present invention provides methods, systems and computer program products for estimating changes in an object represented by first and second multidimensional datasets. The first dataset is a reference dataset and the second dataset is an altered dataset. Discrete data samples of the first dataset are processed to form a piecewise continuous representation thereof. An error function is computed for comparisons between discrete data samples in the second dataset and the piecewise continuous representation of the first dataset. An alteration of the second dataset relative to the first dataset that minimizes the error function is determined.

In at least one embodiment, a method of estimating changes in an object represented by first and second multidimensional datasets is provided, where the first dataset is a reference dataset and the second dataset is an altered dataset. The method includes processing discrete data samples of the first dataset to form a piecewise continuous representation thereof; computing an error function for comparisons between discrete data samples in the second dataset and the piecewise continuous representation of the first dataset; determining an alteration of the second dataset relative to the first dataset that minimizes the error function; and performing at least one of storing or outputting parameters of the alteration.

In at least one embodiment, the error function is an analytical error function.

In at least one embodiment, the discrete data samples comprise data vectors, each data vector including a plurality of data values.

In at least one embodiment, the processing discrete data samples of the reference dataset to form a continuous representation thereof comprises forming a multi-dimensional spline representation of the reference dataset.

In at least one embodiment, the processing discrete data samples of the reference dataset to form a continuous representation thereof comprises forming a non-separable, multi-dimensional spline representation of the reference dataset.

In at least one embodiment, the method includes formulating the multidimensional spline representation from a series of one-dimensional splines.

In at least one embodiment, at least one highest order term of a polynomial representing the multi-dimensional spline is set to a zero value.

In at least one embodiment, the error function comprises a sum-squared error function.

In other embodiments, other error functions can be used, including, but not limited to: a cross-correlation metric, a normalized-correlation metric, or a sum of the absolute differences metric.

In at least one embodiment, the determination of an alteration of the second dataset relative to the first dataset that minimizes the error function comprises use of a generalized companion matrix.

In at least one embodiment, the alteration is a local alteration estimate for a particular overlap orientation between a subset of discrete data samples in the second dataset and a subset of the piecewise continuous representation, and the method further includes computing the error function for all possible overlap orientations between the subset of discrete data samples in the second dataset and the subset of the piecewise continuous representation of the first dataset; and identifying an overall minimum from the respective minima of all error functions computed, wherein the overall minimum is representative of a global alteration.

In at least one embodiment, alteration is a local alteration estimate for a particular overlap orientation between a subset of discrete data samples in the second dataset and a subset of the piecewise continuous representation, and the method further includes computing the error function for a subset of all possible overlap orientations between the subset of discrete data samples in the second dataset and the subset of the piecewise continuous representation of the first dataset; and identifying an overall minimum from the respective minima of all error functions computed, wherein the overall minimum is representative of a global alteration.

In at least one embodiment, the alteration estimates rigid-body motion of the object.

In at least one embodiment, the alteration estimates at least one of compression and stretching of the object.

In at least one embodiment, the alteration estimates shearing of the object.

In at least one embodiment, the outputting comprises displaying an image indicating estimated alterations of the object.

In at least one embodiment, the samples of the first and second datasets comprise data values of ultrasonic signals measured by an ultrasonic imaging apparatus.

In at least one embodiment, normalizing is performed to provide the same scaling for the discrete data samples of the first and second datasets prior to the forming of the piecewise continuous representation.

A method of forming a piecewise continuous representation of a first multidimensional dataset comprising discrete data samples for comparison with discrete data samples in a second multidimensional dataset is provided, including: forming one of a non-separable, multi-dimensional spline representation and a separable, multidimensional spline representation of the first dataset; and storing the multi-dimensional spline representation in computer memory.

In at least one embodiment, the first multidimensional dataset is a two-dimensional dataset and the forming comprises: forming one-dimensional splines along a first dimension of the dataset, joining adjacent data samples along the first dimension; forming one-dimensional splines along a second dimension of the dataset, joining adjacent data samples along the second dimension; calculating midpoints of the one-dimensional splines along the second dimension; forming one-dimensional splines along the first dimension, joining the midpoints of the one-dimensional splines along the second dimension; calculating midpoints of the one-dimensional splines along the first dimension; forming one-dimensional splines along the second dimension, joining the midpoints of the one-dimensional splines along the first dimension; and determining spline coefficients.

In at least one embodiment, the first multidimensional dataset is a three-dimensional dataset and the forming comprises: forming one-dimensional splines along a first dimension of the dataset, joining adjacent data samples along the first dimension; forming one-dimensional splines along a second dimension of the dataset, joining adjacent data samples along the second dimension; forming one-dimensional splines along a third dimension of the dataset, joining adjacent data samples along the third dimension; calculating midpoints of the one-dimensional splines along the first dimension; forming one-dimensional splines along the second and third dimensions, joining the midpoints of the one-dimensional splines along the first dimension; calculating midpoints of the one-dimensional splines along the second dimension; forming one-dimensional splines along the first and third dimensions, joining the midpoints of the one-dimensional splines along the second dimension; calculating midpoints of the one-dimensional splines along the third dimension; forming one-dimensional splines along the first and second third dimensions, joining the midpoints of the one-dimensional splines along the third dimension; and determining spline coefficients.

A method of estimating motion of an object represented by first and second multidimensional datasets is provided, where the first dataset is a reference dataset and the second dataset is a delayed dataset, the method including: processing discrete data values of the first dataset to form a piecewise continuous representation thereof; selecting a region of interest from the delayed dataset; selecting a region of interest from the piecewise continuous representation; performing a plurality of overlap positionings of the selected region of interest of the delayed dataset on the selected region of interest of the piecewise continuous representation, wherein each overlap comprise a different position of the region of interest from the delayed dataset relative to the region of interest from the piecewise continuous dataset; generating an error function for each overlap positioning; calculating a minimum of the error function; and performing at least one of storing or outputting a location of the minimum.

A system for estimating alteration between first and second multidimensional datasets is provided, where the first dataset is a reference dataset and the second dataset is a altered dataset, the system including: an alteration estimation module comprising at least one processor and programming configured to process discrete data samples of the first dataset to form a piecewise continuous representation thereof; select a region of interest from the altered dataset; select a region of interest from the piecewise continuous representation, perform overlap positioning of the selected region of interest from the altered dataset on the region of interest of the piecewise continuous representation; generate an error function for each overlap positioning; and calculate a minimum of the error function; and means for outputting at least one value calculated by the alteration estimation module.

In at least one embodiment, the system further includes an imaging system.

In at least one embodiment, the imaging system is an ultrasonic imager.

A computer readable medium carrying one or more sequences of instructions for estimating alteration represented by first and second multidimensional datasets is provided, wherein execution of one or more sequences of instructions by one or more processors causes the one or more processors to perform the steps of: processing discrete data samples of the first dataset to form a piecewise continuous representation thereof; selecting a region of interest from the second dataset; selecting a region of interest from the piecewise continuous representation; performing overlap positioning of the selected region of interest from the second dataset on the region of interest from the piecewise continuous representation; generating an error function for each overlap positioning; and calculating a minimum of the error function.

These and other features of the invention will become apparent to those persons skilled in the art upon reading the details of the methods systems and computer program products and computer readable media as more fully described below.

BRIEF DESCRIPTION OF THE DRAWINGS

FIG. 1 illustrates a general flow chart showing a motion estimate computed from input datasets.

FIG. 2 is a schematic representation of an alteration estimator system according to one embodiment of the present invention.

FIGS. 6A-6I are graphic illustrations of events referred to in FIG. 5.

DETAILED DESCRIPTION OF THE INVENTION

Figure 3:
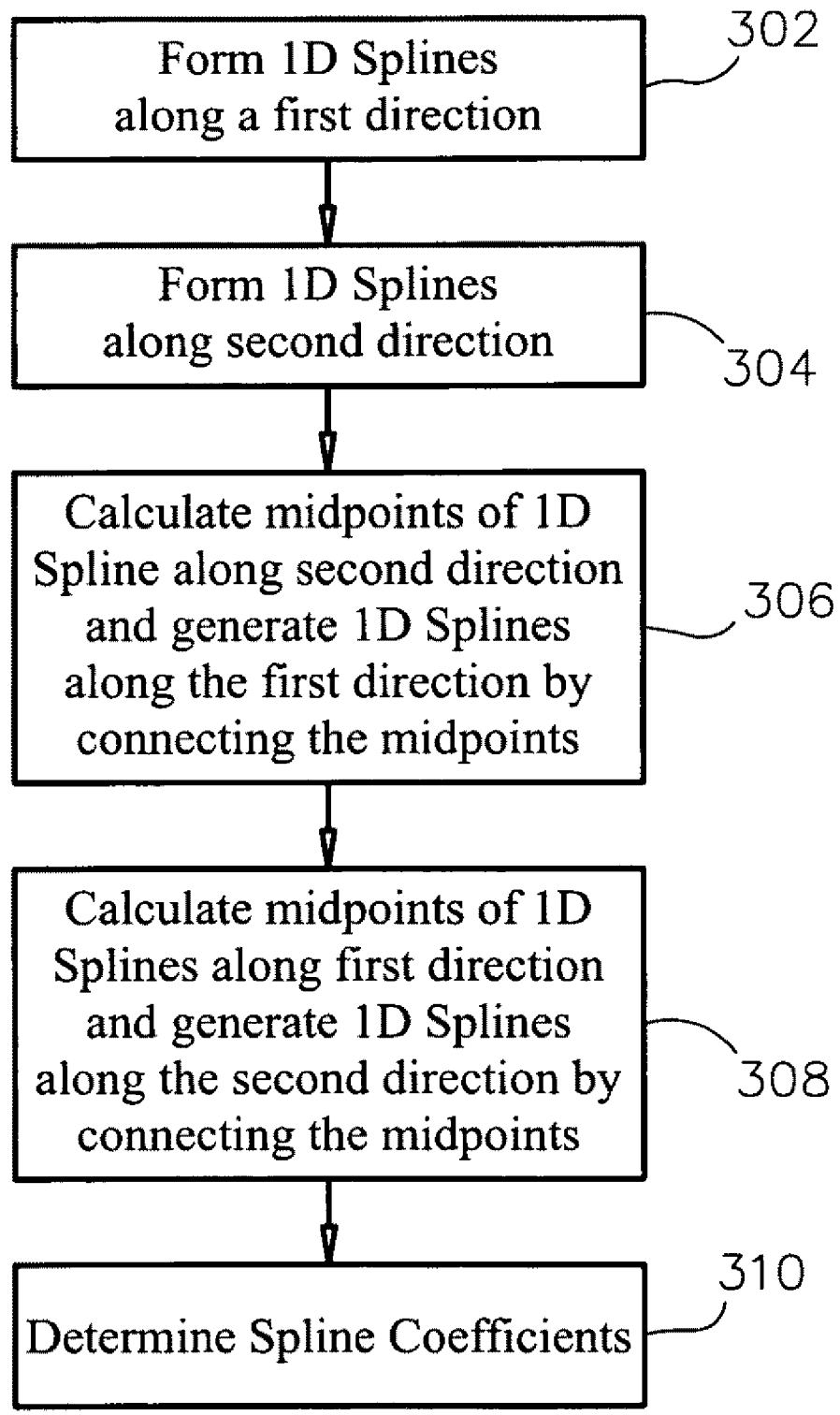
FIG. 3 illustrates events that may be carried out in formulating a 2D spline representation of a 2D dataset according to the present invention.

Before the present methods, systems and algorithms are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a spline" includes a plurality of such splines and reference to "the image" includes reference to one or more images and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

A "reference dataset" refers to an arbitrary collection of data samples (which could be arranged in, or representative of two, three or higher dimensions depending on the specific application).

A "displaced dataset" or "delayed dataset" "or altered dataset" refers to a dataset that is related to the reference dataset and contains a collection of data samples that represent a displaced, delayed or otherwise altered version of the reference dataset. For example, a reference and an altered dataset may refer to two images or volumes from which data samples, representative of those images or volumes were obtained before and after an alteration (e.g., rigid-body motion, including, but not limited to rotation, or more complex deformations). In two dimensions, the two datasets could be representative of two different image frames.

A "patch" refers to the area located within four neighboring samples in two dimensions, or the volume defined by eight neighboring samples in three dimensions, when the samples in each case are connected to nearest neighbors by straight lines.

An "object", as used herein, refers to material objects, such as solid, liquid and/or gas, as well as to any other physical phenomenon that can be represented by a multidimensional set of scalar values, as well as to mathematical equations, a field of complex numbers, a field of quaternions, or other multidimensional sets of scalar values.

A "sample" may refer to a discrete data value, or a vector including a plurality of discrete data values.

The present invention calculates estimates of displacement or delay or other alteration that are much smaller than the distance between two consecutive data samples taken to measure what is being tracked for displacement or delay or alteration, in every dimension of a multidimensional dataset.

The process of motion estimation is generally concerned with the determination of the N-dimensional (ND) shift between two ND datasets. Generally, the first ND dataset, which may be referred to as the reference dataset is an ND set of data points and can be any multi-dimensional collection of discrete samples. Examples of two-dimensional datasets includes, but are not limited to data samples for generating computerized axial tomography (CAT) images, magnetic resonance imaging (MRI) images, images obtained from a microscope, frames of a movie, etc., or data samples of the images themselves.

The second ND dataset, which may be referred to as the displaced dataset or altered dataset is of the same dimensionality as the first ND dataset, but is typically generated after the reference dataset (or what is represents) has undergone rigid body motion and/or more complex deformations. The displaced or altered dataset may refer to a plurality of such displaced or altered datasets, e.g., the second third, fourth, etc. datasets generated after the first (reference) dataset, such as in a string of images, for example. Thus, for example, if the datasets represent images of an object, and if the object is not moving, the data points in the second ND dataset will be identical to the data points in the first ND dataset, and thus the original image of the first ND dataset will be identical in position to the "displaced" or "altered" image of the second ND dataset, since no displacement or alteration has occurred in this example. However, when the object is moving, the data points of two different ND datasets, which can be used to estimate the motion or deformation of the object, will vary.

It is further noted that the present invention is not limited to measurement of a material object, as the object measured may be a electrical field, a mathematical equation, the density of a gas, or any other multidimensional set of scalar values that represent a physical phenomenon.

Motion estimation (also sometimes called image registration is carried out by applying pattern matching techniques that test for each possible overlap between data points in the first ND dataset and data points in a subset of the second ND dataset to produce a function that indicates the quality of the match between the signals (data points) at various relative delays. Each overlap tested corresponds to a specific relative delay. For each overlap, a figure of merit is calculated to indicate how good, on a relative scale, that the match was between the two datasets overlapped for that specific overlap (or relative delay). The figures of merit, expressed as a function, are then searched to locate the position of the best match between the data points (signals) in datasets, which indicates the shift, or motion that has occurred. The "true" shift, which is multidimensional, is chosen by comparing the figures of merit obtained for every overlap.

FIG. 1 illustrates a general flow chart showing a motion estimate computed from input datasets 10 and 12 which, in this case, are two-dimensional (2D) datasets, including a reference dataset $I_1[m,n]$ and a delay dataset $I_2[m,n]$, respectively. The inputs 10, 12 are compared using a pattern matching algorithm that is applied to the datasets 10, 12 to test for each possible overlap between dataset 10 and dataset 12, thereby computing 14 a pattern matching function 16, in this case denoted by $c_{12}(m,n)$. The pattern matching function 16 indicates the quality of the match between the datasets 10 and 12 for every overlap. Pattern matching function 16 is searched 18 to locate the position of the best match among a set of comparisons made, which indicates the position 20 of dataset 12 relative to dataset 10. Searching is performed by simply locating the best value within $c_{12}[m,n]$. The best value depends on the algorithm used. For example, where sum squared error is used, the minimum of $c_{12}(m,n)$, is calculated. In FIG. 1, the position 20 is indicated by $[m_o, n_o]$, the movement in the X- and Y-directions of the displaced dataset relative to the reference dataset 10, using an X-Y coordinate system. These estimates of movement are not a sub-sample, but are a multiple of the distance between two consecutive samples in both (X and Y) directions.

FIG. 2 is a schematic representation of an alteration estimator system 100 according to one embodiment of the present invention. The system 100 includes computer hardware and/or software and/or firmware configured to carry out the processes 22, 14 and 18 as described herein, to calculate a pattern matching function 16 and to output results that indicate the position 20 of dataset 12 relative to dataset 10. Output 120 may be in the form of an image of the motion or other alteration, such as on a computer display, for example, showing movement or other alteration of the location of dataset 10 and then displaying the movement or other alteration to the location of dataset 12. Alternatively, the output 120 may show the location of dataset 10 statically and then sequentially show the location of dataset 12. These static images may be overlaid upon one another for comparison to show the relative movement (displacement) delay or alteration. Alternatively, or additionally, numeric representation of the position coordinates 20 may be outputted to a computer display, with or without the reference coordinates of the reference dataset 10 so that a user can more easily interpret the quantification of the movement. Any of these outputs can alternatively, or additionally be stored to a memory storage device, and/or transmitted to another computer or user, and static images and numeric outputs can be printed out, for example.

FIG. 2 illustrates a generalized example of motion estimation computed from input datasets 10 and 12 which, in this case, are a reference dataset $I_1[ND]$ and a delay or displaced dataset $I_2[ND]$, respectively, where N is an integer greater than 1, wherein each dataset 10, 12 can be two-, three-, four-dimensional, or to any dimensionality greater than one, but wherein the dimensions of dataset 10 are the same as those contained in dataset 12. Thus, for example, a 2D dataset contains data points (e.g., values of signals received after being reflected off of an object to be imaged, or other data values) in two dimensions (2-dimensional matrix) and a 3D dataset contains data points in three dimensions.

The data values of the datasets 10, 12 are discrete sample values, as they describe a location of points at a interval. Alternatively, each sample value may be a vector of discrete data values. For example, each sample value may contain red, green and blue values for a location on an image. Thus, the motion or other change of the data values of a displaced or altered dataset 12 relative to the reference dataset 10 between the interval at which the reference dataset 10 was measured and the interval that the displaced or altered dataset 12 was measured is not measured by the measurement system. The present invention processes the discrete data samples of reference dataset 10 to form a multi-dimensional (typically 2D or 3D, although 4D or higher may be applied) cubic spline representation thereof 22. The spline representation is preferably a non-separable spline representation, but may be a separable spline representation. Use of a separable spline representation further reduces computational cost (time), but also results in a corresponding loss in fidelity of results. In either case, this spline representation is a continuous representation of the reference input 10 and is inputted, along with the discrete samples of the second dataset 12 to the pattern matching function module of system 100 that minimizes an error function between the splined dataset 22 and the displaced dataset 12. When first and second datasets 10,12 have different scaling, datasets 10,12 may first be normalized to provide the same scaling prior to formation of the spline representation 22. The location of this minimum at 18 indicates the displacement 20 between the datasets 12 and 10. The sub-sample displacement can then be used to form any of the outputs referred to above, including, but not limited to a vector showing the motion of the object as it moves between the reference location from which the reference dataset 10 was generated, to the calculated location of the displaced dataset 12.

Formulation of a 2D Spline Representation

A 2D non-separable spline is a piecewise continuous representation of a surface. Each patch within the surface at position (i,j) can be described by the following 16 coefficient bicubic polynomial:

$$f_{i,j}(x, y) = {_0}\kappa_{i,j} + {_1}\kappa_{i,j}x + {_2}\kappa_{i,j}y + {_3}\kappa_{i,j}x^2 + {_4}\kappa_{i,j}y^2 + \\ {_5}\kappa_{i,j}xy + {_6}\kappa_{i,j}x^3 + {_7}\kappa_{i,j}y^3 + {_8}\kappa_{i,j}x^2 y + {_9}\kappa_{i,j}xy^2 + {_{10}}\kappa_{i,j}x^3 y + \\ {_{11}}\kappa_{i,j}xy^3 + {_{12}}\kappa_{i,j}x^2 y^2 + {_{13}}\kappa_{i,j}x^3 y^2 + {_{14}}\kappa_{i,j}x^2 y^3 + {_{15}}\kappa_{i,j}x^3 y^3 \tag{1}$$

where "x" and "y" represent the independent variables in a two-dimensional coordinate system; "i" and "j" represent the variable indexing of the patches; and each of the "κ" coefficients represents a constant to be determined.

Although Viola et al, reference above, describes use of splines for one-dimensional signal interpolation and one-dimensional estimation, it does not disclose or teach the formulation of non-separable 2D splines (or multi-dimensional splines in general). The obvious and straightforward approach referred to by Viola et al. above ("A Novel Spline-Based Algorithm for Continuous Time-Delay Estimation Using Sampled Data") is to form a large set of simultaneous equations describing requirements for continuity with the sampled data, data and derivative continuity between spline patches, and appropriate boundary conditions. Unfortunately such a thorough approach for non-separable cubic splines would require solving a coupled set of equations for a total of M×N×16 coefficients, where M and N are the number of samples in the two image dimensions. Typically, direct formulation and solution of such systems of equations is too costly with regard to memory and computing power to be amenable to most applications.

Figure 4C:
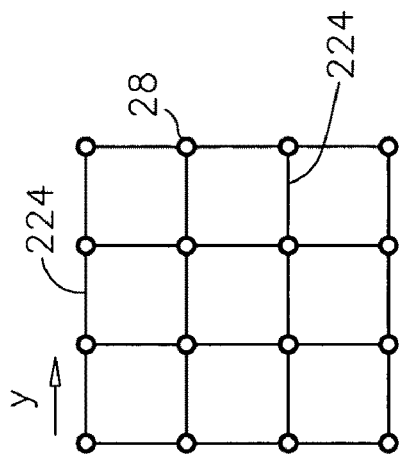
FIGS. 4A-4F are graphic illustrations of events referred to in FIG. 3.
Figure 4F:
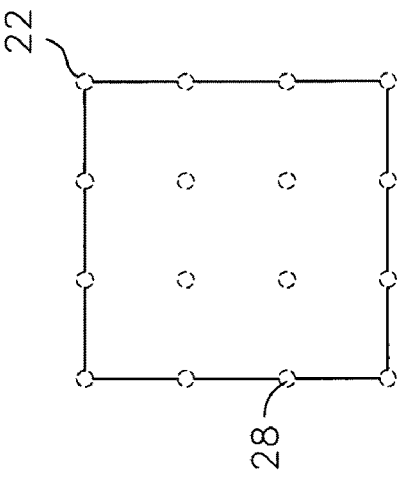
Figure 4B:
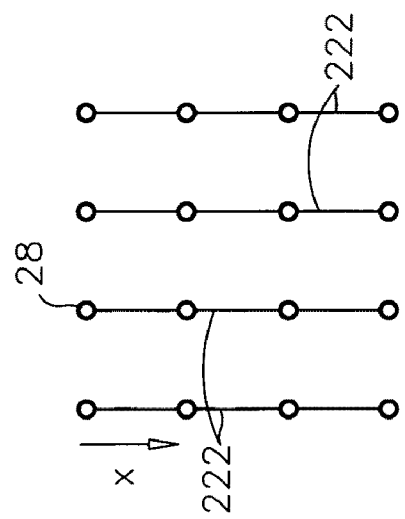

In contrast, the present invention formulates a 2D spline from a series of simple 1D splines. Although a non-separable 2D spline is a 16 parameter polynomial, as shown in equation (1), this approach yields a 15 parameter polynomial where the highest order term (i.e., the coefficient multiplying $x^3 y^3$) is set to zero. FIG. 3 illustrates events that may be carried out in formulating a 2D spline representation of a 2D dataset according to the present invention, and FIGS. 4A-4F are referred to for graphic illustrations of events referred to in FIG. 3. Starting with reference dataset 10, which may be an image, but in any case is represented by data values 28 arranged in the dataset 10 (in a 2D arrangement, in this example, see FIG. 4A, note, dataset 10 will typically have many more data values, but only a small number of data values are shown for simplicity and clarity of explanation, one-dimensional (1D) splines 222 are formed along a first direction (e.g., the X-direction, as shown in FIG. 4B, although the order may be reversed such that splines are first formed in the Y-direction, followed by formation in the X-direction at event 302, followed by formation of 1D splines 224 in the second direction of the two-dimensional coordinates at event 304 (Y-direction in FIG. 4C, although this order could be reversed, as noted).

Figure 4E:
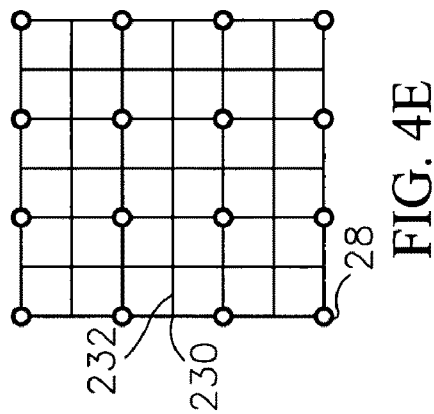
Figure 4A:
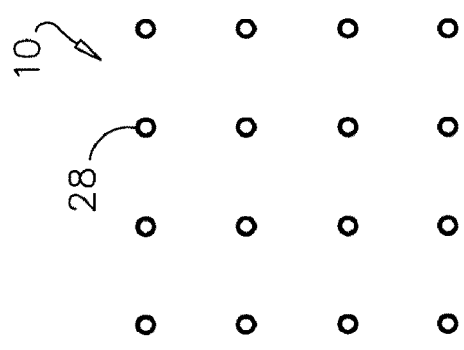
Figure 4D:
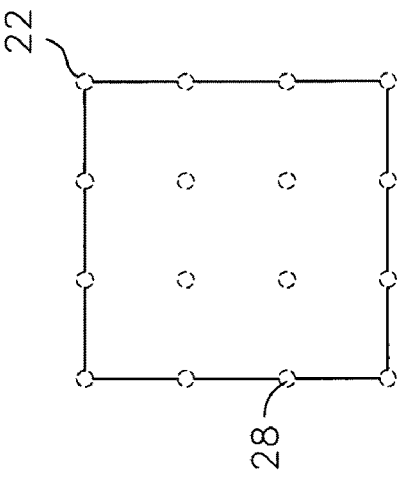

Next, at event 306, midpoints of the 1D splines 224 along the second direction are calculated and 1D splines 228 are generated along the first direction through the midpoints 226 of the 1D splines running in the second direction, as illustrated in FIG. 4D. At event 308, midpoints of the 1D splines 222 along the first direction are calculated and 1D splines 232 are generated along the second direction through the midpoints 230 of the 1D splines 222, 228 running in the first direction, as illustrated in FIG. 4E. At event 310, the spline coefficients of the spline representation 22 of dataset 10 are determined by forcing equality to the 1D splines formed at events 304, 306 and 308. The spline representation 22 is shown in FIG. 4F.

Each of the events 302-310 is modest in terms of both computation and memory costs. The approach is rapid and yields a very high quality interpolation of the underlying image data. The 1D splines along the x direction can be expressed mathematically by:

$$p_j(x) = \begin{cases} 0 \le x < \chi & {_0}\alpha_{1,j} + {_1}\alpha_{1,j}x + {_2}\alpha_{1,j}x^2 + {_3}\alpha_{1,j}x^3 \\ \vdots & \vdots \\ (i-1)\chi \le x < i\chi & {_0}\alpha_{1,j} + {_1}\alpha_{1,j}x + {_2}\alpha_{1,j}x^2 + {_3}\alpha_{1,j}x^3 \\ \vdots & \vdots \\ (M-2)\chi \le x < (M-1)\chi & {_0}\alpha_{M-1,j} + {_1}\alpha_{M-1,j}x + \\ & {_2}\alpha_{M-1,j}x^2 + {_3}\alpha_{M-1,j}x^3 \end{cases} \tag{2}$$

where χ is the sample interval along the x direction. Note that this expression is simply a 1D cubic spline representation, and as normally determined, will pass through each of the original image points 28. A total of 2N−1 1D spline representations will be formed along the x direction. Cubic spline representations can be computed using the spline command in MATLAB. Alternatively, finite impulse response (FIR)

filters can be used to obtain the 1D spline coefficients. Alternative approaches to calculating cubic spline representations may be used.

Similar expressions are provided for the 1D splines along the y direction:

$$q_j(y) = \begin{cases} 0 \leq y < \delta & {}_0\beta_{i,1} + {}_1\beta_{i,1}y + {}_2\beta_{i,1}y^2 + {}_3\beta_{i,1}y^3 \\ \vdots & \vdots \\ (j-1)\delta \leq y < j\delta & {}_0\beta_{i,j} + {}_1\beta_{i,j}y + {}_2\beta_{i,j}y^2 + {}_3\beta_{i,j}y^3 \\ \vdots & \vdots \\ (N-2)\delta \leq y < (N-1)\delta & {}_0\beta_{i,N-1} + {}_1\beta_{i,N-1}y + \\ & {}_2\beta_{i,N-1}y^2 + {}_3\beta_{i,N-1}y^3 \end{cases} \quad (3)$$

where δ and is the sample interval in the y direction. A total of 2M−1 1D spline representations are formed along the y direction.

Formulation of a 3D Spline Representation

A 3D non-separable spline is a piecewise continuous representation of a volume dataset. Each region within the volume at positions (i,j,k) can be described by the following 64 coefficient tricubic polynomial:

$$f_{i,j,k}(x, y, z) = {}_0\kappa_{i,j,k} + {}_1\kappa_{i,j,k}x + {}_2\kappa_{i,j,k}y + {}_3\kappa_{i,j,k}z + {}_4\kappa_{i,j,k}xy + {}_5\kappa_{i,j,k}xz + \quad (4)$$
$${}_6\kappa_{i,j,k}yz + {}_7\kappa_{i,j,k}x^2 + {}_8\kappa_{i,j,k}y^2 + {}_9\kappa_{i,j,k}z^2 + {}_{10}\kappa_{i,j,k}xyz + {}_{11}\kappa_{i,j,k}x^2y +$$
$${}_{12}\kappa_{i,j,k}x^2z + {}_{13}\kappa_{i,j,k}xy^2 + {}_{14}\kappa_{i,j,k}y^2z + \ldots + {}_{59}\kappa_{i,j,k}x^2y^2z^2 +$$
$${}_{60}\kappa_{i,j,k}x^3y^3z^2 + {}_{61}\kappa_{i,j,k}x^3y^2z^3 + {}_{62}\kappa_{i,j,k}x^2y^3z^3 + {}_{63}\kappa_{i,j,k}x^3y^3z^3.$$

where "x", "y" and "z" represent the independent variables in a three-dimensional coordinate system; "i", "j" and "k" represent the variable indexing of the patches (each volume within eight neighboring samples) and each of the "κ" coefficients represents a constant to be determined.

As with the formulation of a 2D spline representation, a set of simple 1D splines can be used to generate an approximated 3D spline 22 throughout the volume of interest (consisting of M×N×P samples in the x, y, and z dimensions, respectively). Extended to a 3D spline, this approach yields 54 of the 64 terms of a 3D cubic polynomial, where coefficients multiplying each of the terms $x^3y^3z^n$, $x^3y^nz^3$, $x^ny^3z^3$ were set to zero (where n=0, 1, 2, 3).

Figure 5:
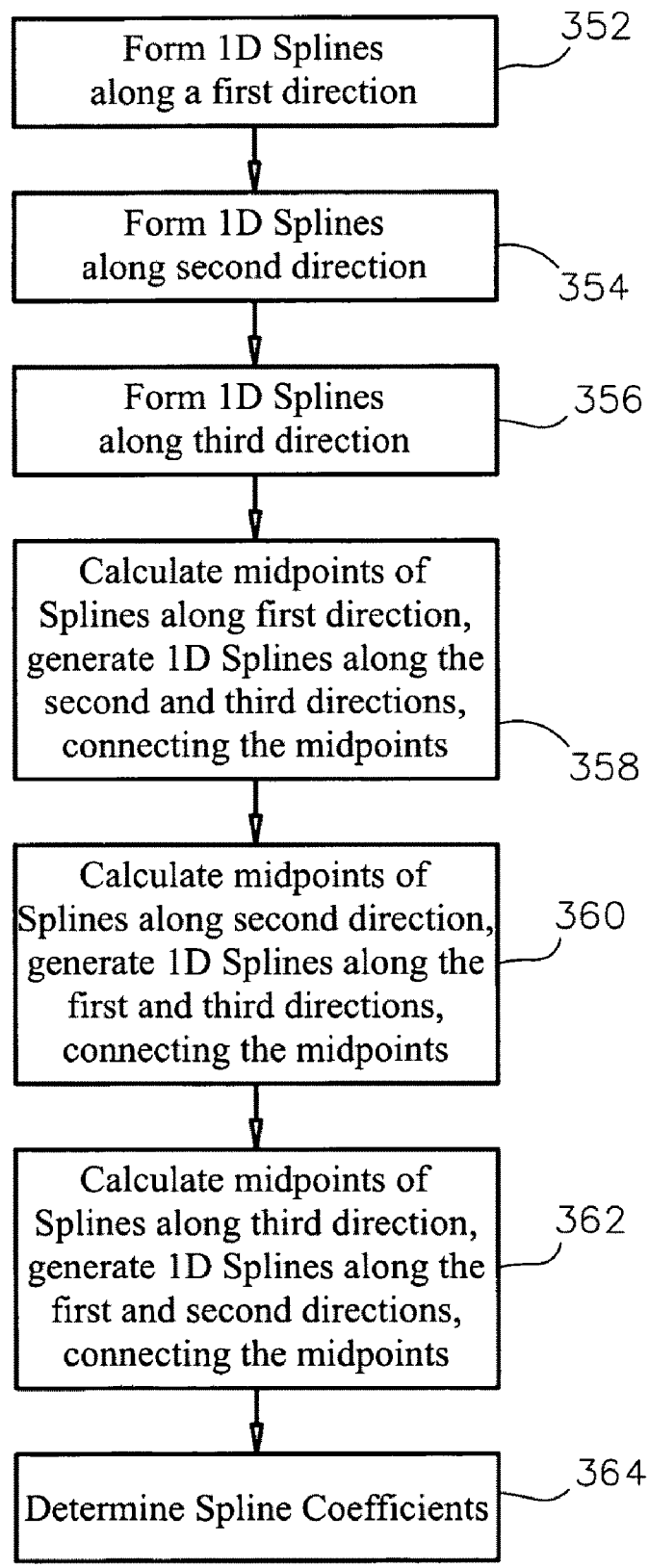
FIG. 5 illustrates events that may be carried out in formulating a 3D spline representation of a 3D dataset according to the present invention.
Figure 6I:
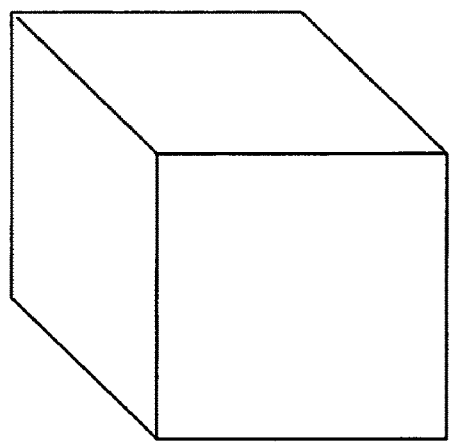
Figure 6H:
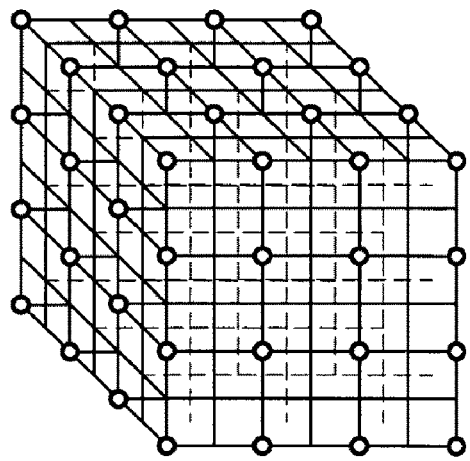

FIG. 5 illustrates events that may be carried out in formulating a 3D spline representation of a 3D dataset according to the present invention, and FIGS. 6A-6I are referred to for graphic illustrations of events referred to in FIG. 5. Starting with reference dataset 10, which may be an image, but in any case is represented by data values 28 arranged in the dataset 10 (in a 3D arrangement, in this example, see FIG. 6A, note, dataset 10 will typically have many more data values 28, but only a small number of data values are shown for simplicity and clarity of explanation), one-dimensional (1D) splines 222 are formed along a first direction (e.g., the X-direction, as shown in FIG. 6B, although the Y-direction or Z-direction could alternatively be addressed first) at event 352 to join the data points 28 via splines along the X-direction, followed by formation of 1D splines 224 in a second direction of the three-dimensional coordinates at event 354 (Y-direction in FIG. 6C, although this could be a different direction, as noted). Next, at event 356, 1D splines 234 are formed along the third direction (Z-direction in FIG. 6D, although this could be a different direction, as noted), to connect data points 28 in the third direction.

At event 358, midpoints 226 of the 1D splines 222 along the first direction (again, the order could be changed, as midpoints could be calculated along the second direction or the third direction first) are calculated and 1D splines 228 are generated along the second and third directions through the midpoints 226 of the 1D splines running in the first direction, as illustrated in FIG. 6E. At event 360, midpoints 230 of the 1D splines 224 along the second direction are calculated and 1D splines 232 are generated along the first and third directions through the midpoints 230 of the 1D splines 224, 228 running in the second direction, as illustrated in FIG. 6F.

Figure 6G:
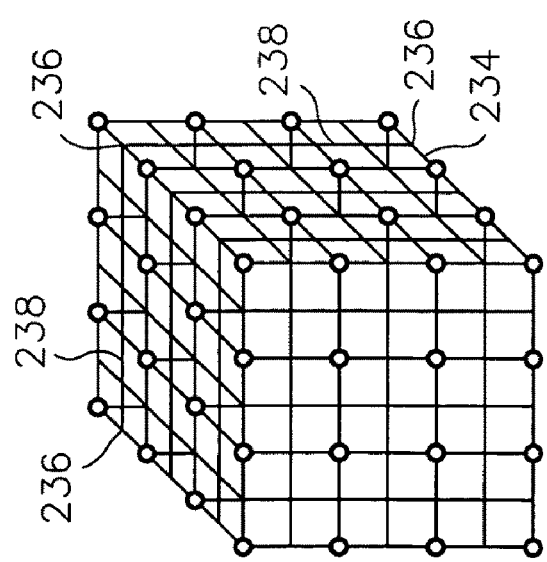

At event 362, midpoints 236 of the 1D splines 234 along the third direction are calculated and 1D splines 238 are generated along the first and second directions through the midpoints 236 of the 1D splines 234, 228 running in the third direction, as illustrated in FIG. 6G. At event 364, spline coefficients of the spline representation 22 of 3D dataset 10 are determined by forcing equality to the 1D splines, i.e., where the multidimensional spline is forced to equal the numerical values of the one-dimensional splines formed at events 352-362. The spline representation 22 is shown in FIG. 6I.

Each of the events 352-364 is modest in terms of both computation and memory costs, relative to existing methods. The 1D splines along the X-direction can be expressed mathematically by:

$$p_{j,k}(x) = \quad (5)$$

$$\begin{cases} 0 \leq x < \chi & {}_0\alpha_{1,j,k} + {}_1\alpha_{1,j,k}x + \\ & {}_2\alpha_{1,j,k}x^2 + {}_3\alpha_{1,j,k}x^3 \\ \vdots & \vdots \\ (i-1)\chi \leq x < i\chi & {}_0\alpha_{i,j,k} + {}_1\alpha_{i,j,k}x + \\ & {}_2\alpha_{i,j,k}x^2 + {}_3\alpha_{i,j,k}x^3 \\ \vdots & \vdots \\ (M-2)\chi \leq x < (M-1)\chi & {}_0\alpha_{M-1,j,k} + {}_1\alpha_{M-1,j,k}x + \\ & {}_2\alpha_{M-1,j,k}x^2 + {}_3\alpha_{M-1,j,k}x^3 \end{cases}$$

where χ is the sample interval along the x direction. A total of 4NP−2P−2N+1 1D spline representations are formed along the x direction to account for the whole volume. Similar expressions are provided for the 1D splines along the y and z directions:

$$q_{i,k}(y) = \quad (6)$$

$$\begin{cases} 0 \leq y < \delta & {}_0\beta_{i,1,k} + {}_1\beta_{i,1,k}y + {}_2\beta_{i,1,k}y^2 + {}_3\beta_{i,1,k}y^3 \\ \vdots & \vdots \\ (j-1)\delta \leq y < j\delta & {}_0\beta_{i,j,k} + {}_1\beta_{i,j,k}y + {}_2\beta_{i,j,k}y^2 + {}_3\beta_{i,j,k}y^3 \\ \vdots & \vdots \\ (N-2)\delta \leq y < (N-1)\delta & {}_0\beta_{i,N-1,k} + {}_1\beta_{i,N-1,k}y + \\ & {}_2\beta_{i,N-1,k}y^2 + {}_3\beta_{i,N-1,k}y^3 \end{cases}$$

-continued $$r_{i,j}(z) = \begin{cases} 0 \le z < \zeta & {}_0\sigma_{i,j,1} + {}_1\sigma_{i,j,1}z + {}_2\sigma_{i,j,1}z^2 + {}_3\sigma_{i,j,1}z^3 \\ \vdots & \vdots \\ (k-1)\zeta \le z < k\zeta & {}_0\sigma_{i,j,k} + {}_1\sigma_{i,j,k}z + {}_2\sigma_{i,j,k}z^2 + {}_3\sigma_{i,j,k}z^3 \\ \vdots & \vdots \\ (P-2)\zeta \le z < (P-1)\zeta & {}_0\sigma_{i,j,P-1} + {}_1\sigma_{i,j,P-1}z + {}_2\sigma_{i,j,P-1}z^2 + {}_3\sigma_{i,j,P-1}z^3 \end{cases} \quad (7)$$

where δ and ζ are the sample intervals in the y and z directions, respectively. A total of 4MP−2M−2P+1 splines are formed in the y directions and 4MN−2M−2N+1 splines in the z direction.

Motion Estimation

The system 100 estimates multi-dimensional displacement between reference 10 and displaced 12 datasets by localizing the minima of a pattern matching function 16. As one example, the sum-squared error may be utilized as a metric of the match quality. Alternative metrics that could be used include, but are not limited to: a cross-correlation metric, a normalized-correlation metric, or a sum of the absolute differences metric, etc. Piecewise continuous polynomial functions, as described above, are used to produce a spline representation 22 of the reference dataset 10. Considering the 3D case, the sum squared difference error function for a specific overlap between the reference 10 and the sampled displaced 12 regions can be described mathematically as:

$$E(x, y, z) = \sum_{i=1}^{Q} \sum_{j=1}^{R} \sum_{k=1}^{S} (f_{i,j,k}(x, y, z) - s_2[i, j, k])^2 \quad (8)$$

where $f_{i,j,k}(x,y,z)$ is the polynomial representation of the reference volume 10 located at indices i, j, k as described in (4), $s_2[i,j,k]$ is the displaced volume 12 sample at indices i, j, k, and Q, R, S are the number of samples in the three orthogonal dimensions of the displaced volume 12. Note that many other error functions can be used, depending upon the computational constraints and physical challenges of the problem.

The location of the minimum of (8) represents a local displacement estimate for a given overlap between the reference 10 and displaced 12 datasets. The globally optimal displacement estimate is found by minimizing (8) for all possible overlaps between the reference 10 and displaced 12 datasets. The local displacement estimate with overall minimum error and value between 0 and 1 for each component of the displacement vector is chosen as the global estimate.

The minima of the error functions can be found, in one example, by using the "fminsearch" function of MATLAB. While this method is easy and straightforward to implement, it is a gradient descent method and can be trapped by local minima and can be slow to iterate if proper search parameters are not selected. Alternatively, a "generalized companion matrix" may be used to solve the systems of multidimensional polynomials that are presented by the error functions when addressing the finding of a minimum. The approach requires finding eigenvalues of a sparse matrix, which is a well-bounded problem that has been well-studied. Further details about this approach can be found in Manocha, "Algorithms for computing selected solutions of polynomial equations", Extended abstract, Proceedings of ACM ISSAC, 1994, and Manocha, "Solving Systems of Polynomial Equations", IEEE Computer Graphics Applications, pp. 46-55, March, 1994, both of which publications are hereby incorporated herein, in their entireties, by reference thereto. Alternatively, as discussed in Viola et al., "Efficient and Accurate Spline-Based Time Delay Estimation", IEEE Ultrasonic Symposium, 2004, which is hereby incorporated herein, in its entirety, by reference thereto, higher order polynomial equations can be approximated by smaller order polynomial equations. As one example, fifth-order polynomial equations can be approximated by third-order polynomial equations, and then the third order polynomial equations can be solved for their roots to find a minimum.

Figure 7:
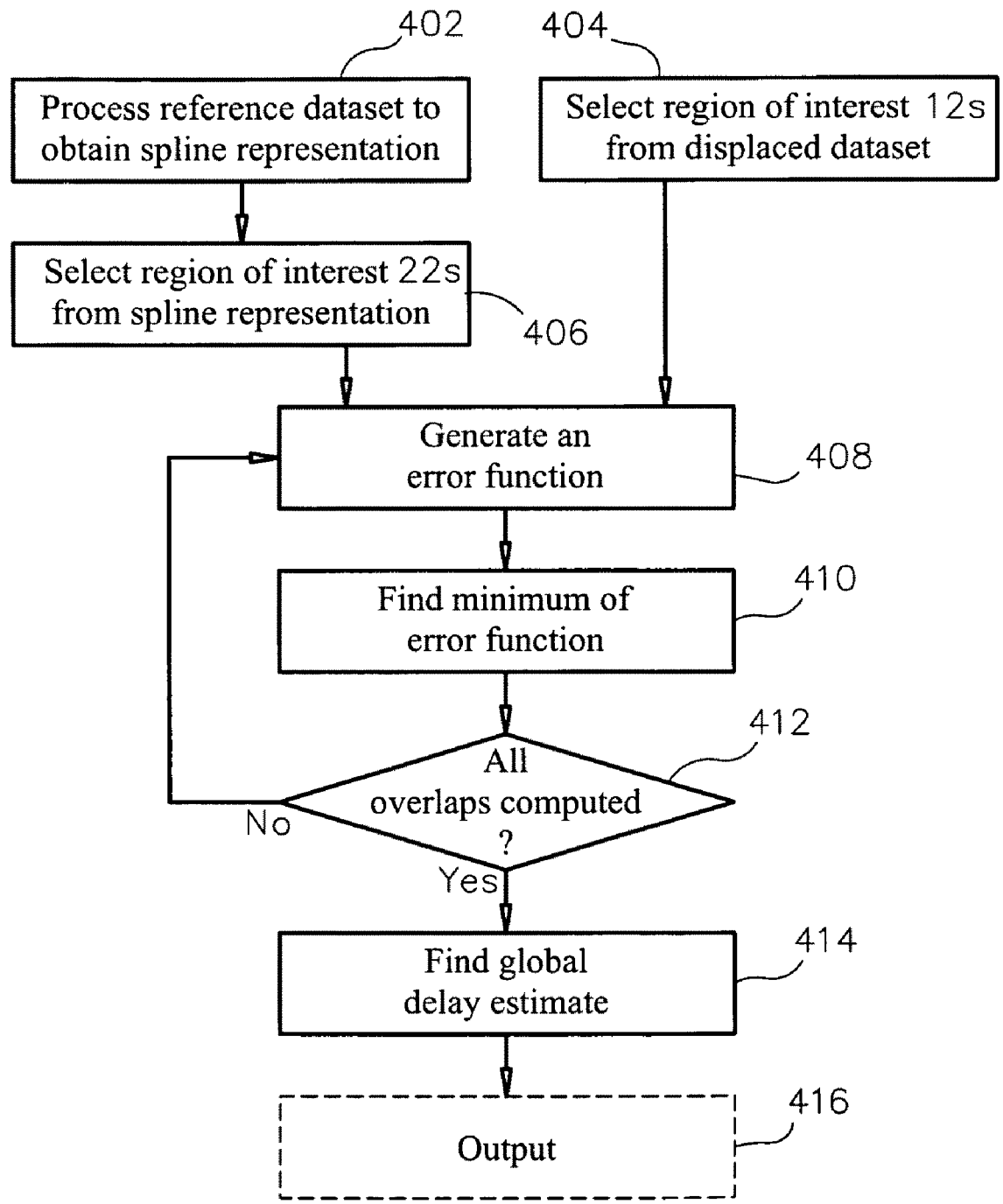
FIG. 7 shows events that may be carried out by a system according to the present invention to estimate motion.
Figure 8:
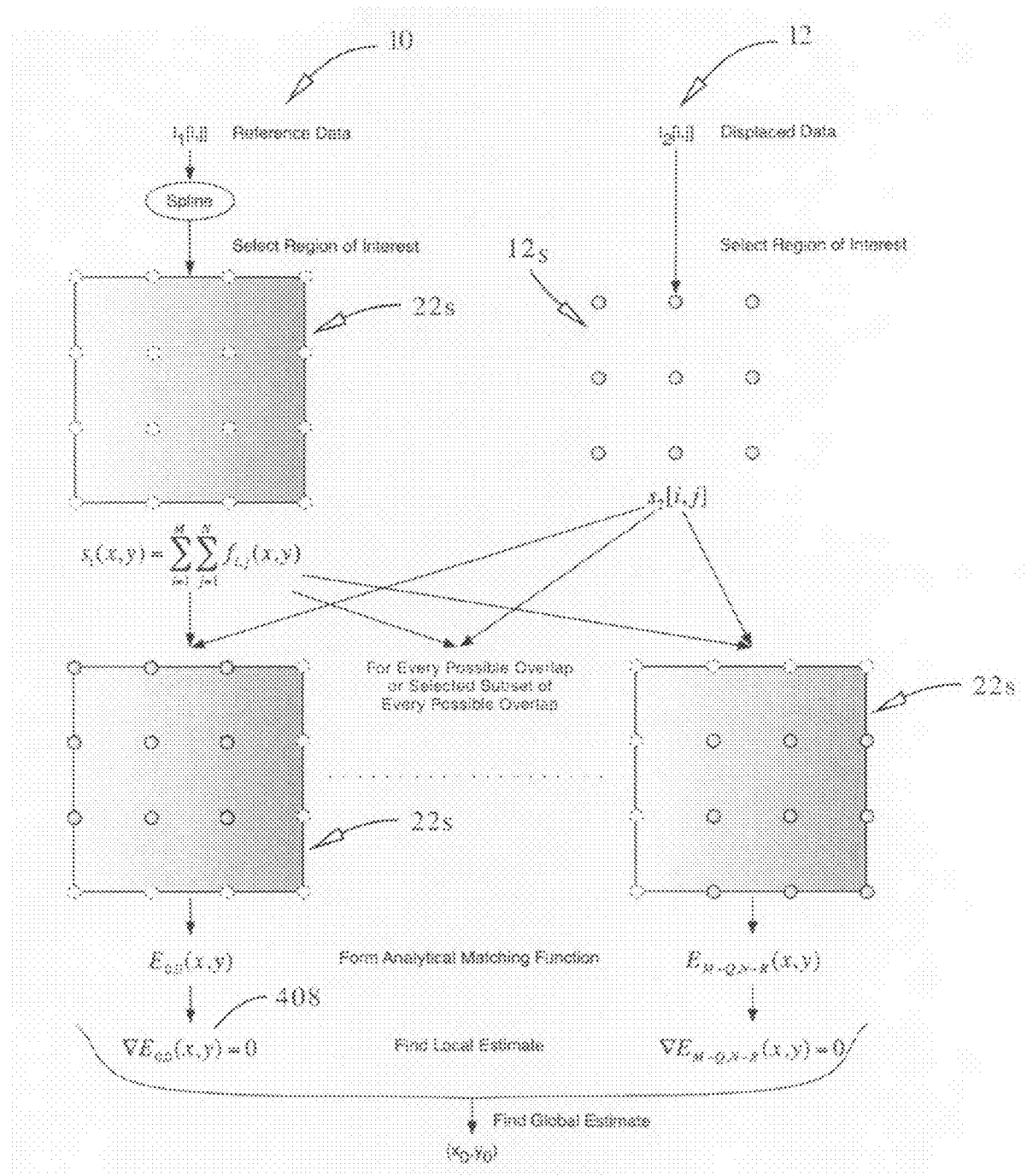
FIG. 8 is a schematic representation of a 2D example of motion estimation. of the same.

FIG. 7 shows events that may be carried out by system 100 to estimate motion, and FIG. 8 is a schematic representation of a 2D example of the same. After receiving input datasets 10, 12, whether from an external instrument, from an integrated measurement instrument, or from storage, either internally of system 100 or from an external storage source, the reference dataset 10 is processed at event 402 to produce an analytical representation thereof, such as spline 22 representation, in a manner as described above. A subset 12s of displaced dataset 12 can be selected at event 404 as a region of interest, which represents the portion of the dataset 12 that the system tracks to calculate displacement A subset 22s is selected at event 406 against which subset 12s is to be overlapped. Accordingly, subset 22s is selected to be larger that subset 12s. The regions of interest 12s, 22s may be selected by a user such as via a user interface, for example, by outlining the regions of interest using drop and drag, brushing, or other mouse techniques, or through the use of keyboard strokes to assign coordinates of data points outlining the region of interest, or through a variety of other selection techniques that are currently performed in other computer product systems and would be apparent to one of ordinary skill in the art. Alternatively, the selection of the regions of interest 12s, 22s may be automatically performed by the system 100. The region of interest 12s is used for comparison with the region of interest 22s of spline 22 to estimate motion of region 12s.

Next, comparisons of the data point 28 in the region of interest 12s are made with the spline locations in the region of interest 22s of spline 22. An overlap of region of interest 12s is performed on region of interest 22s with region of interest 12s positioned in a first overlap orientation on region of interest 22s. At event 408, an error function is computed for the positions of data values of the region of interest 12s relative to the values of the region of interest 22s, for that particular overlap. A minimum of the error function is then computed at event 410. At event 412, it is determined whether all overlap positions of region of interest 12s on region of interest 22s have been computed. In this regard, the system can be set to position region of interest 12s at all possible overlap positions on region of interest 22s and to iteratively generate the error function and find the minimum of the error function for each overlap position. Alternatively, the system may be preset to perform only a subset of all possible overlap positions, thereby performing a sparse search to obtain a global estimate of delay or displacement, in the same manner as will be described when all overlap positions are considered. When performing the sparse search, however, this requires less computational time and expense, with the tradeoff being that the global estimate may not be as accurate. Alternatively, the sparse search can be followed by a finer search when it is desired to obtain better accuracy and precision in the global estimate. For any of these methods, if it is found at event 412 that not all of the overlaps (i.e., all overlaps or all of the subset of overlaps to be performed) have been performed, then processing returns to event 408, where the next overlap is positioned, and an error function for that overlap is performed, followed by a minimum of that error function (event 410) and a return to event 412.

Once all overlaps have been performed, processing proceeds from event 412 to event 414, where the minima of all of the error functions having been computed in the loop 408-412 are computed. The global delay estimate or global displacement estimate then corresponds to the local estimate with overall minimum error and value between zero and one, for each component of the motion/deformation.

Each minimum of an error function for a particular overlap gives a local estimate of motion or alteration. The global estimate can be found by choosing the local estimate with overall minimum error and value between zero and one for each component of the displacement/alteration vector. At optional event 416, the system may output the global estimate in any form of output 120 that was described above, and/or store the global estimate in any of those forms in a storage device.

FIG. 8 schematically illustrates motion estimation as described above with regard to FIG. 7. Given input datasets 10 and 12, references dataset 10 is processed to obtain an analytical representation using multi-dimensional spline (2D in the case depicted here). For the overlaps of region of interest 12s (of dimensions Q by R) selected from dataset 12 on region of interest 22s of (of dimensions N by M, with N>Q and M>R), the sum squared error (SSE) function is computed. The value of x and y that minimized the SSE is called local motion estimate. The global estimate $(x_0, y_0)$ is found amongst the local estimates by selecting the estimate with minimum error and value between 0 and 1.

Thus, the 2D displacement between a reference dataset 10 and a displaced dataset 12 is estimated by localizing the minimum of the sum squared error (e.g., 2D version of equation (8) or other error function. In the embodiment shown, sum-squared error is used as a metric of the datasets (wherein each dataset may be representative of an image) quality match. Mathematically, the error function for a specific overlap between a reference and a displaced region can be defined as:

$$E(x, y) = \sum_{i=1}^{Q} \sum_{j=1}^{R} (f_{i,j}(x, y) - s_2[i, j])^2 \quad (9)$$

where $f_{i,j}(x,y)$ is the polynomial representation of the reference dataset 10 located at indices i, j as described in (4), $s_2[i,j]$ is the displaced dataset 12 sample at indices i, j, and Q, R are the number of samples in the two orthogonal dimensions of the displaced volume 12.

Non-Rigid Transformation Estimation

The present invention is adaptable for uses in addition, or alternative to rigid-body motion estimation. For example, by modifying equation (8) as shown below, the error minimization process also estimates local 3D compression and stretching. This equation can be modified to constrain the aggregate lateral, axial, and elevational compression to account for an incompressible material. Similar modifications can be made to estimate shear or other complex deformations.

$$E(x, y, z, \varepsilon_x, \varepsilon_y, \varepsilon_z) = \quad (10)$$
$$\sum_{i=1}^{Q} \sum_{j=1}^{R} \sum_{z=1}^{S} (f_{i,j,k}(x - i \cdot \varepsilon_x \cdot \chi, y - j \cdot \varepsilon_y \cdot \delta, z - k \cdot \varepsilon_z \cdot \zeta) - s_2[i, j, k])^2$$

where in this case $\epsilon_x$, $\epsilon_y$, and $\epsilon_z$ are the companding coefficients in the three orthogonal directions. The proposed algorithm is thus particularly suited for applications in tissue elasticity estimation. In one of these approaches, a mechanical deformation is applied to the surface of the tissue and ultrasound radio frequency (RF) signals are obtained before and after deformation to estimate internal displacements. Maps of local strain are then obtained from the gradient of the displacement estimates. Accordingly, system 100 can search simultaneously for both the "best" motion estimate and the "best" companding coefficient.

These modifications can likewise be performed to estimate compression and stretching for datasets of multiple dimensions other than three. For example, equation (11) shows a modified equation for using the error minimization process described herein to also estimate local 2D compression and stretching:

$$E(x, y, \varepsilon_x, \varepsilon_y) = \sum_{i=1}^{Q} \sum_{j=1}^{R} (f_{i,j}(x - i \cdot \varepsilon_x \cdot \chi, y - j \cdot \varepsilon_y \cdot \delta) - s_2[i, j])^2 \quad (11)$$

Equation (11) can be further modified to constrain lateral and axial compression to account for an incompressible material. Similar modifications can be made to estimate shear or other complex deformations.

Figure 9:
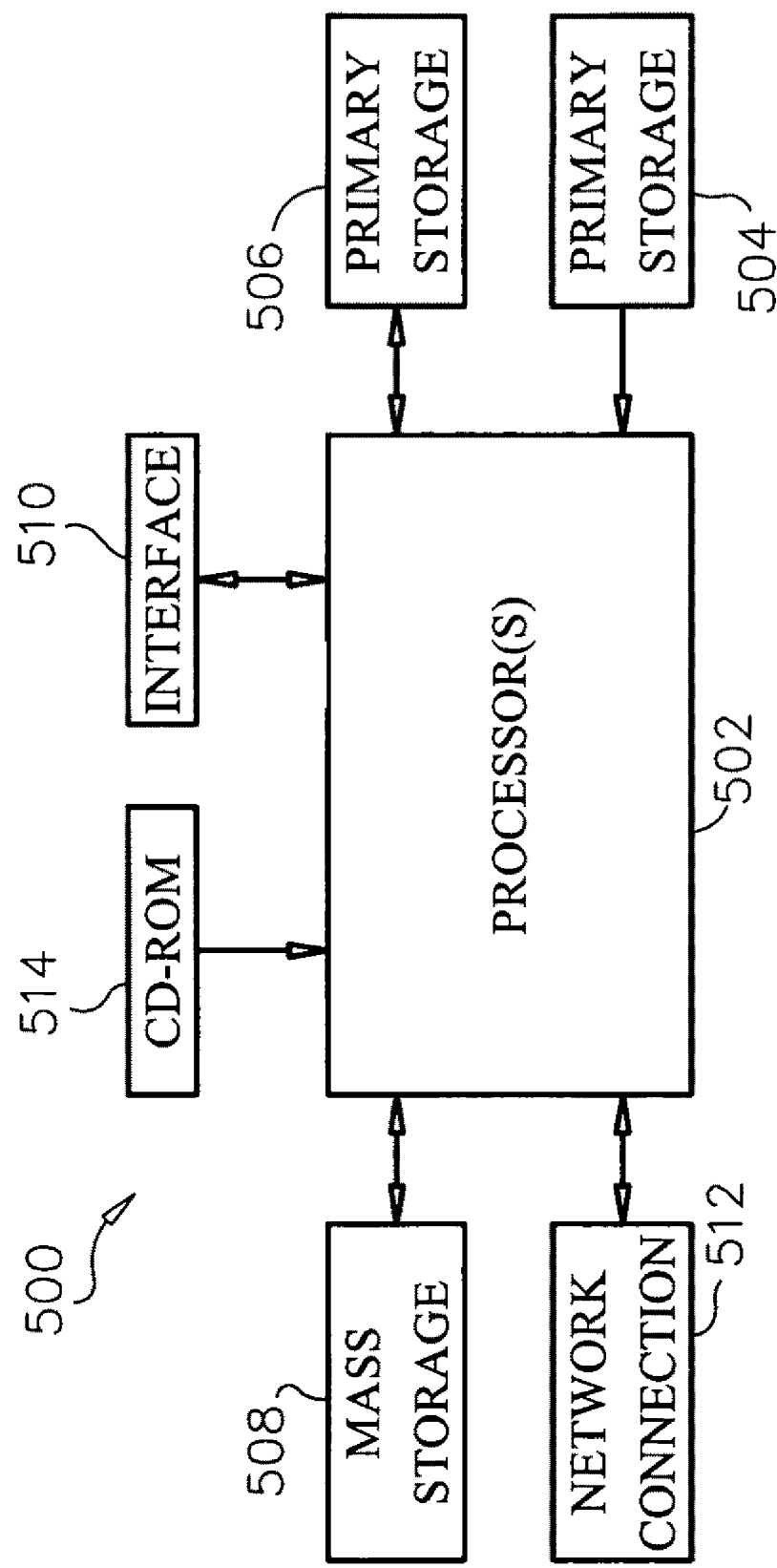
FIG. 9 illustrates a typical computer system in accordance with an embodiment of the present invention.

FIG. 9 illustrates a typical computer system 500 in accordance with an embodiment of the present invention. The computer system 500 in total, or one or more components thereof may be incorporated into a system 100 or a system 200 described herein, or may be configured externally to control one or more functions performed by system 100 or system 200, and/or outputting 120. Computer system 500 includes any number of processors 502 (also referred to as central processing units, or CPUs) that are coupled to storage devices including primary storage 506 (typically a random access memory, or RAM), primary storage 504 (typically a read only memory, or ROM). Primary storage 504 acts to transfer data and instructions uni-directionally to the CPU and primary storage 506 is used typically to transfer data and instructions in a bi-directional manner Both of these primary storage devices may include any suitable computer-readable media such as those described above. A mass storage device 508 is also coupled bi-directionally to CPU 502 and provides additional data storage capacity and may include any of the computer-readable media described above. Mass storage device 508 may be used to store programs, such as motion estimation algorithms and schemes for processing input datasets 10, 12 to calculate motion estimation, companding coefficients, shear, etc.; programming to control waveform emitters and receivers and to generate input datasets 10, 12 therefrom, and or other programming such as that required for producing outputs, storage, etc., and is typically a secondary storage medium such as a hard disk that is slower than primary storage. It will be appreciated that the information retained within the mass storage device 508, may, in appropriate cases, be incorporated in standard fashion as part of primary storage 506 as virtual memory, thereby increasing the effective memory of primary storage 506. A specific mass storage device such as a CD-ROM or DVD-ROM 514 may also pass data uni-directionally to the CPU.

CPU 502 is also coupled to an interface 510 that includes one or more input/output devices such as video monitors, user interface, track balls, mice, keyboards, microphones, touch-sensitive displays, transducer card readers, magnetic or paper tape readers, tablets, styluses, voice or handwriting recognizers, apparatus for inputting datasets 10,12, instruments for emitting signals to reflect them off an object and receiving reflected signals to generate data for input datasets, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps.

The hardware elements described above may implement the instructions of multiple software modules for performing the operations of this invention. For example, instructions for processing input datasets to estimate motion may be stored on mass storage device 508 or 514 and executed on CPU 508 in conjunction with primary memory 506.

In addition, embodiments of the present invention further relate to computer readable media or computer program products that include program instructions and/or data (including data structures) for performing various computer-implemented operations. The media and program instructions may be those specially designed and constructed for the purposes of the present invention, or they may be of the kind well known and available to those having skill in the computer software arts. Examples of computer-readable media include, magnetic media such as hard disks, floppy disks, and magnetic tape; optical media such as CD-ROM, CDRW, DVD-ROM, or DVD-RW disks; magneto-optical media such as floptical disks; and hardware devices that are specially configured to store and perform program instructions, such as read-only memory devices (ROM) and random access memory (RAM), and other physical forms of computer readable matter. Examples of program instructions include both machine code, such as produced by a compiler, and files containing higher level code that may be executed by the computer using an interpreter.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

Example 1

2D Simulations

Computer simulations were performed to quantify the intrinsic bias and variance of system 100 under noise-free imaging conditions and compare it to currently used 2D motion tracking algorithms such as the Sum-Absolute-Differences (SAD) and the Sum-Squared Differences (SSD) both coupled with parabolic sub-sample estimation.

Simulated speckle patterns were generated by convolving a 2D point spread function (psf) with a field of Gaussian amplitude distributed random scatterers. The psf was modeled as the product of a lateral Nuttall window 1.2 mm wide with an axial pulse defined as a Nuttall windowed sinusoid. The psf was defined with a center frequency of 7.5 MHz, a 50% fractional bandwidth, and an f/2 imaging system, to yield a beamwidth of approximately 400 um.

A total of 1,000 unique speckle patterns were generated and sampled at 320 MHz axially and a 16.875 um laterally. These raw datasets were trimmed to eliminate edge effects from the resultant speckle patterns. Datasets were sub-sampled to generate shifted image pairs at all sub-sample displacements of ⅛ sample in each dimension. These sub-sampled images had lateral sampling of 135 um and axial sampling of 40 MHz, making them consistent with current imaging systems.

Reference regions were 8 samples laterally and 20 samples axially (roughly 1.1 mm by 0.4 mm). Displaced image regions were 4 samples laterally and 16 samples axially (roughly 0.54 mm by 0.3 mm). These sub-sampled images were processed by the three algorithms to estimate the 2D sub-sample displacement. Both the bias and standard deviation were estimated over all 1,000 unique speckle patterns, at each sub-sample shift.

Figure 11:
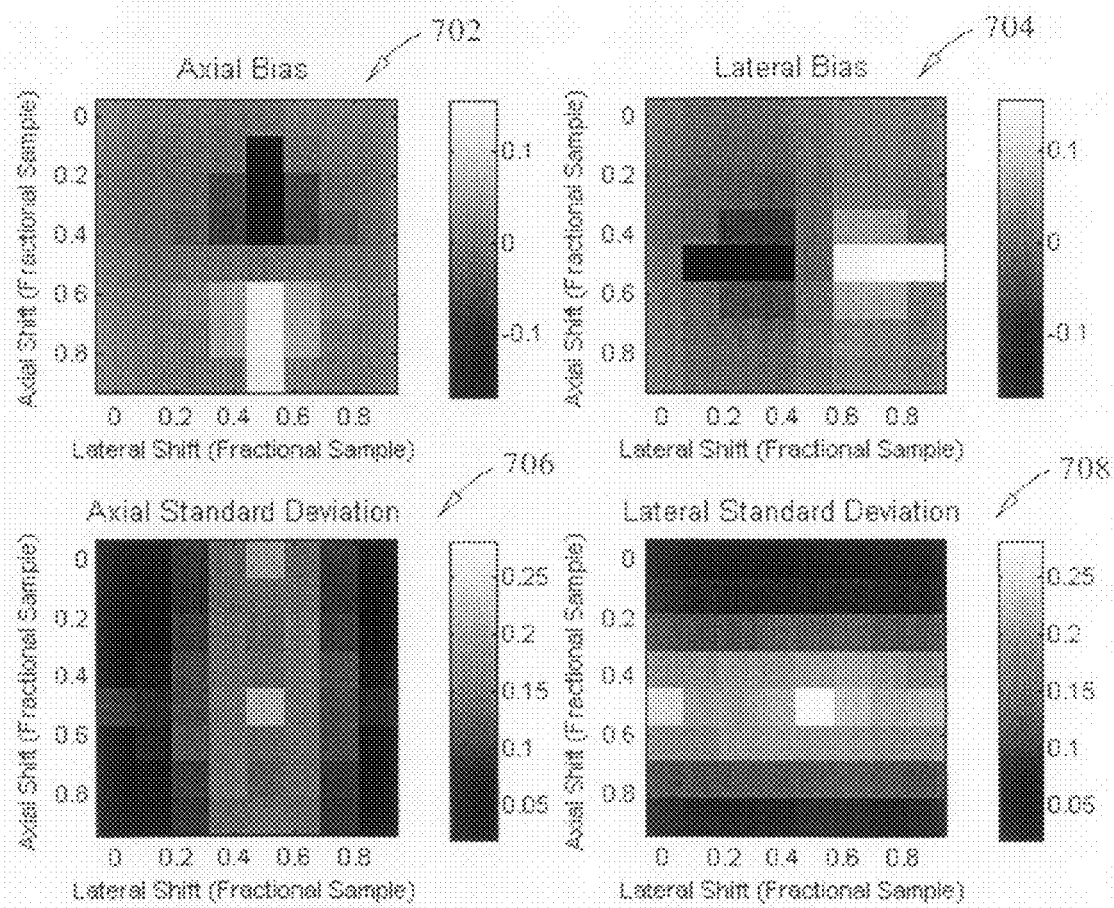
FIG. 11 shows results of the same example as in FIG. 11, but when carried out using a prior art approach using SSD with parabolic sub-sample estimation.
Figure 12:
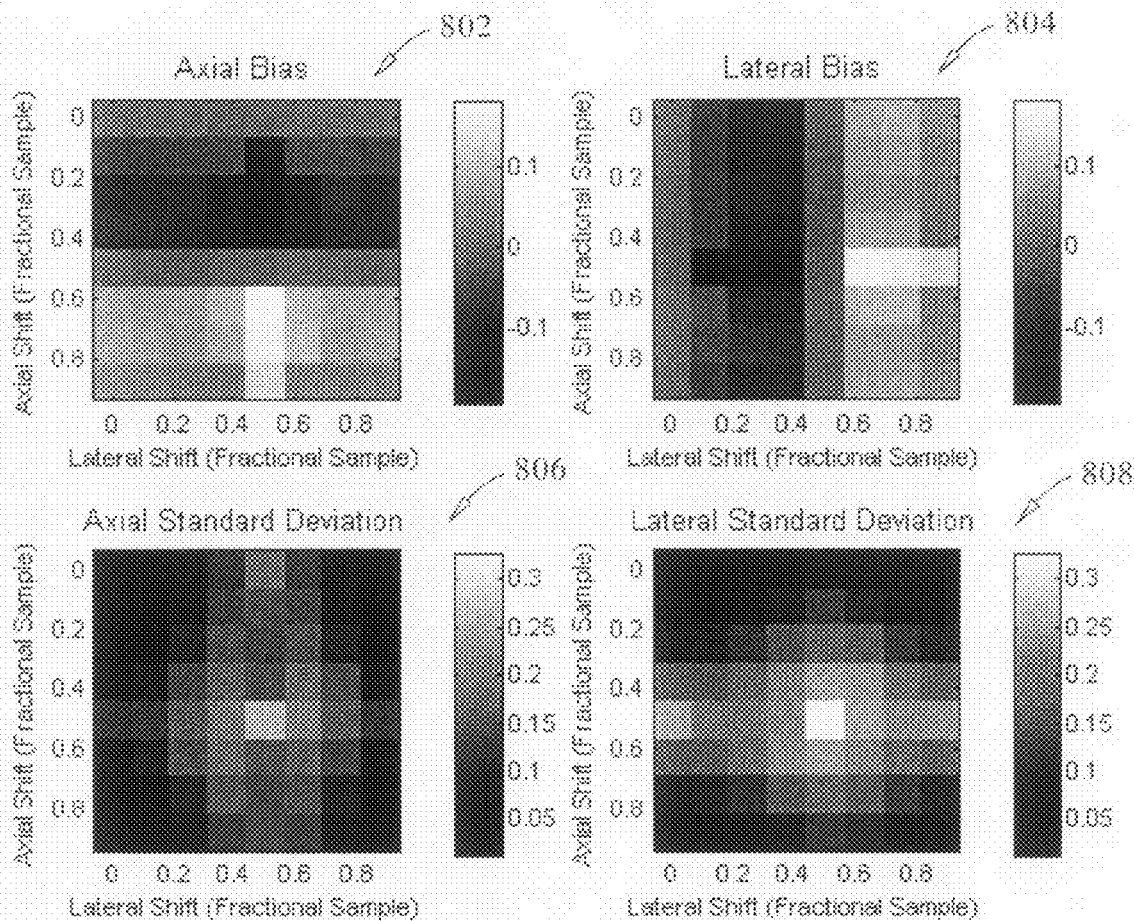
FIG. 12 shows results of the same example as in FIG. 11, but when carried out using a prior art approach using SAD with parabolic sub-sample estimation.
Figure 13A:
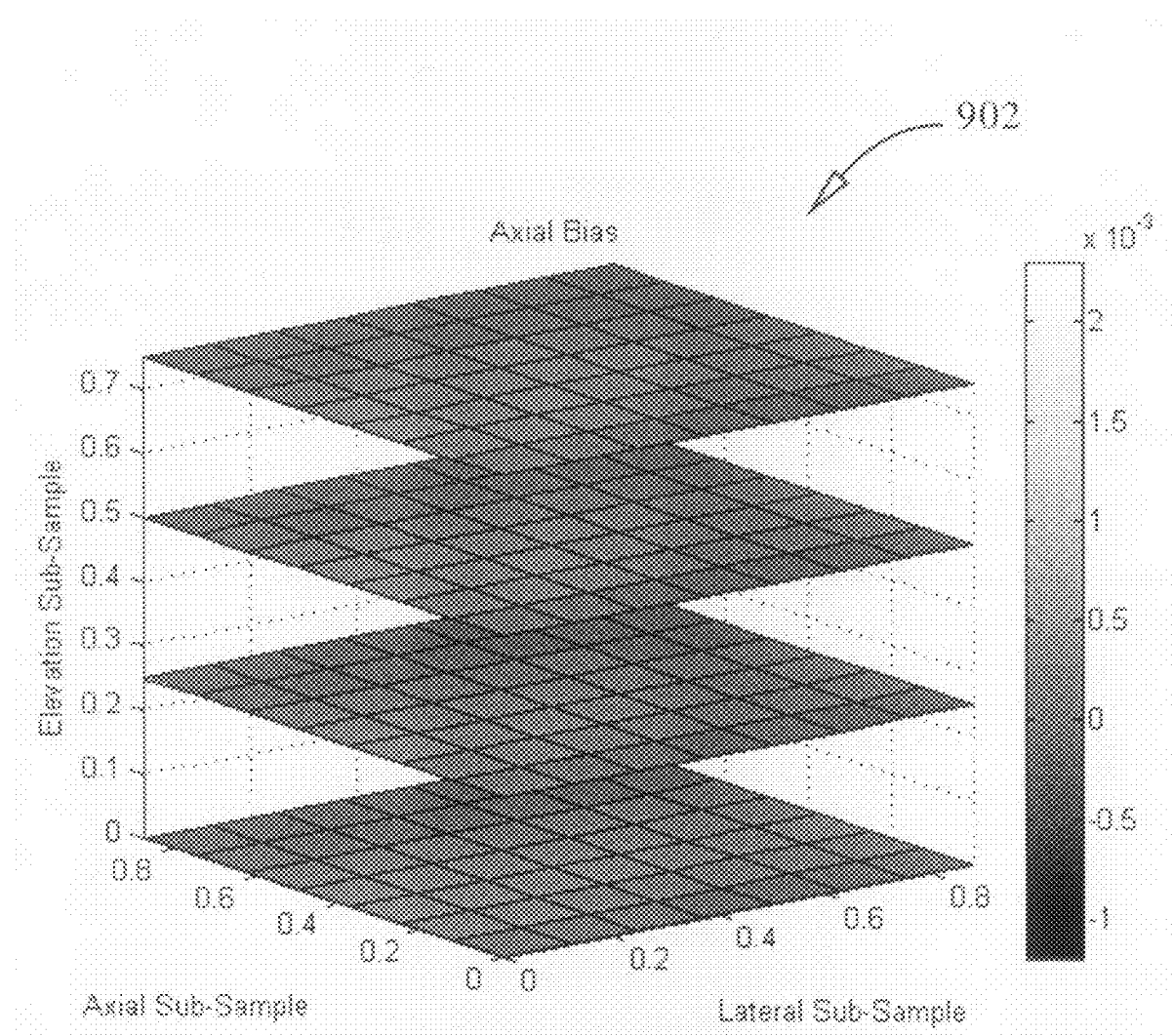
FIG. 13 shows results summarization of a 3D simulation.
Figure 13B:
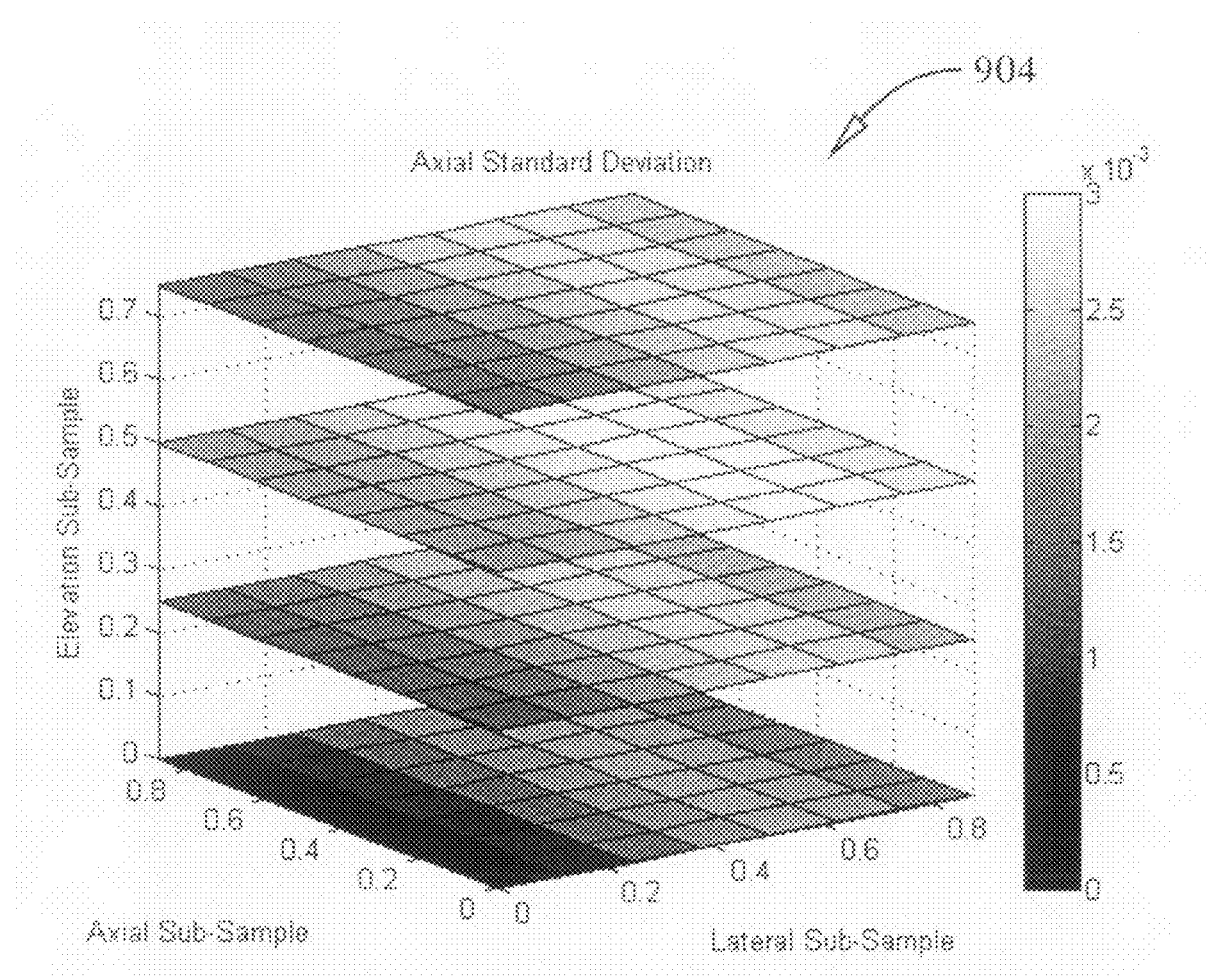
Figure 13C:
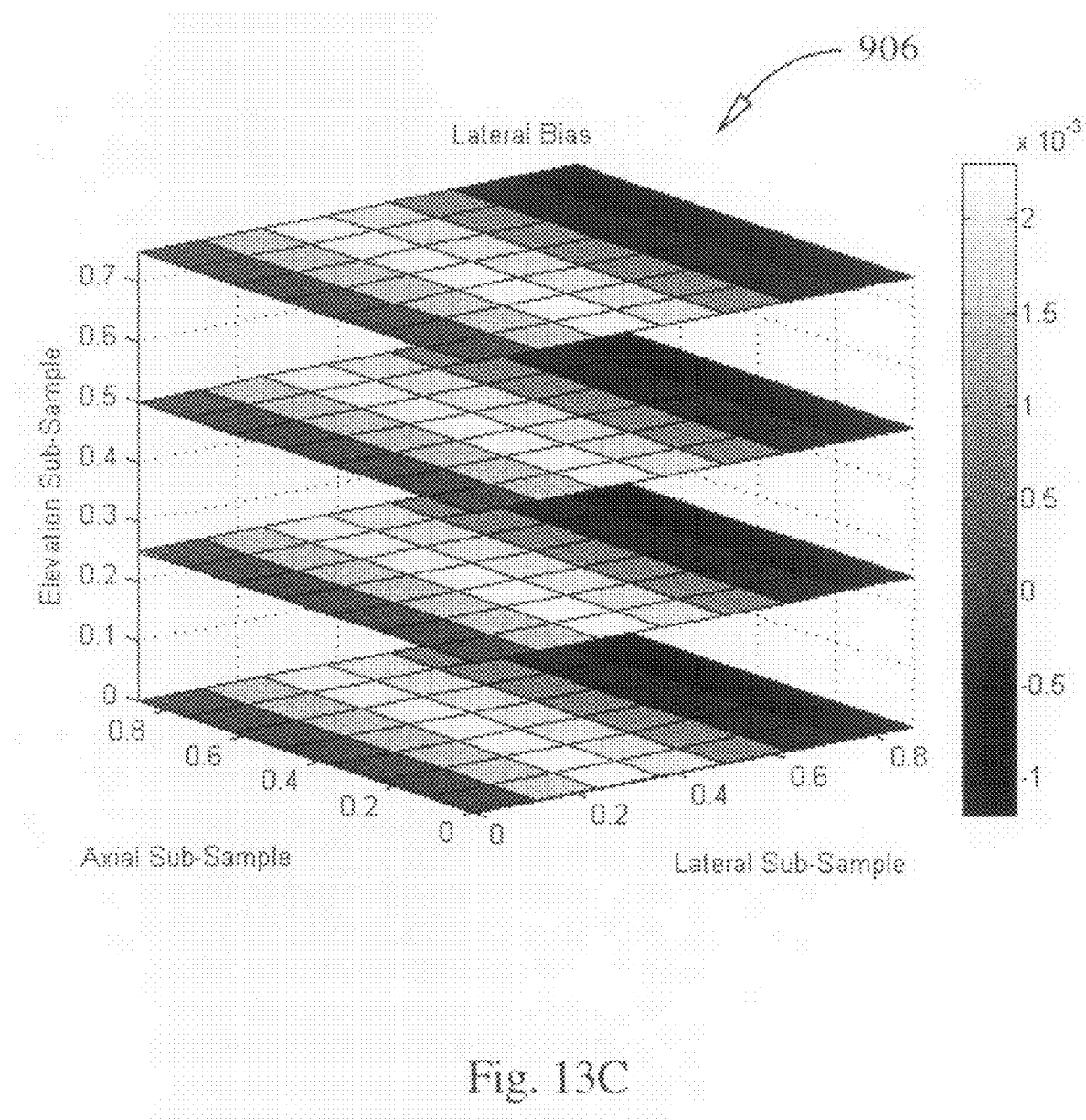
Figure 13D:
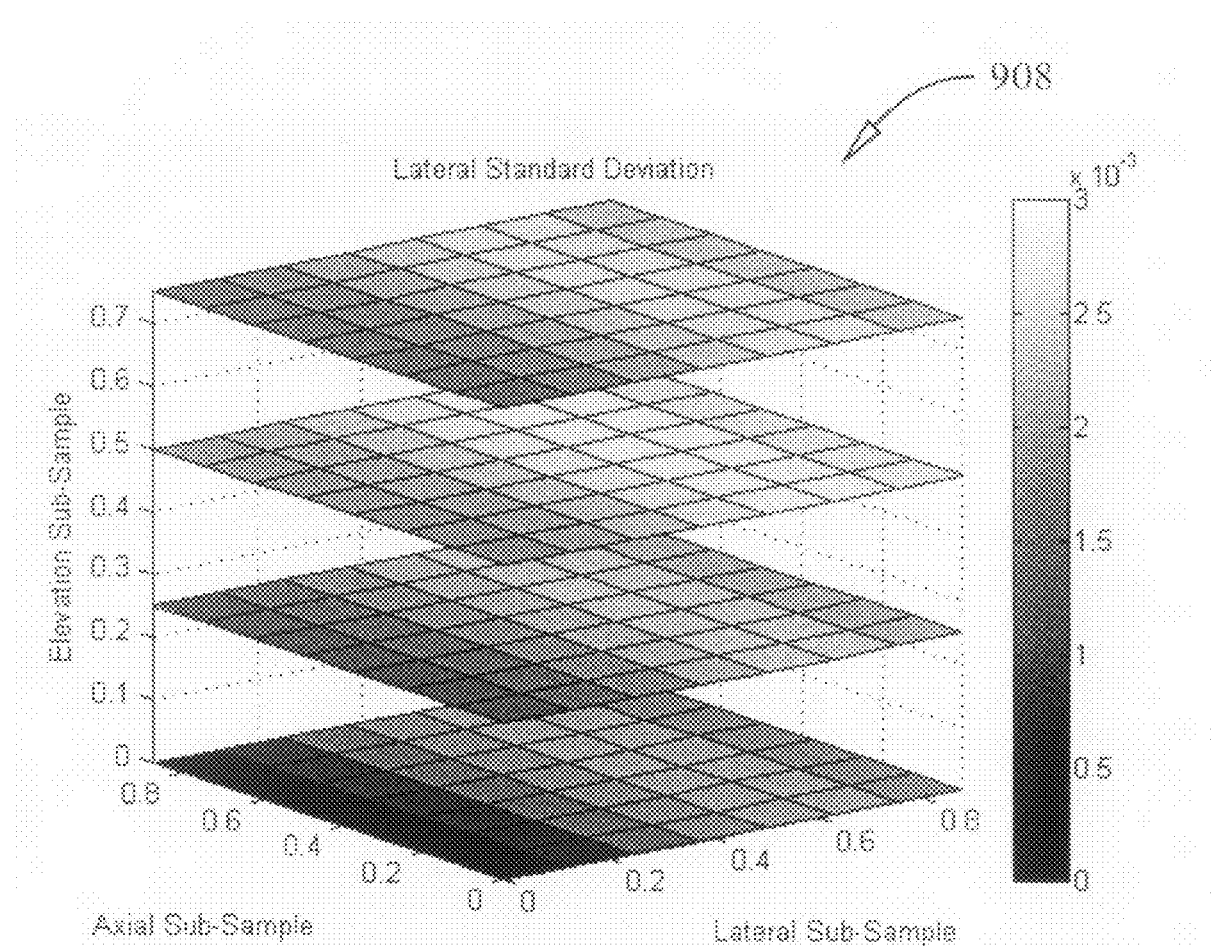
Figure 13E:
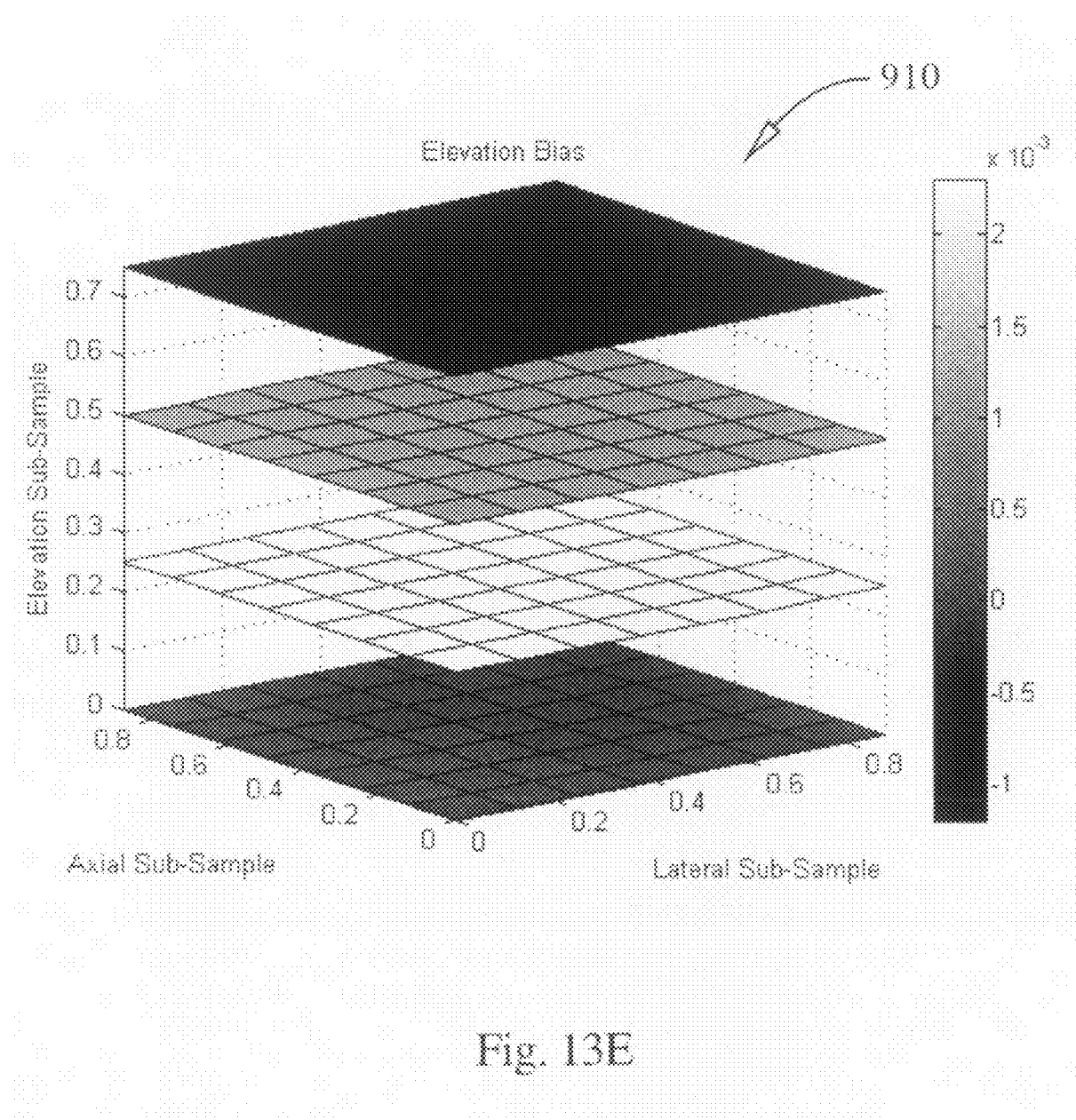
Figure 13F:
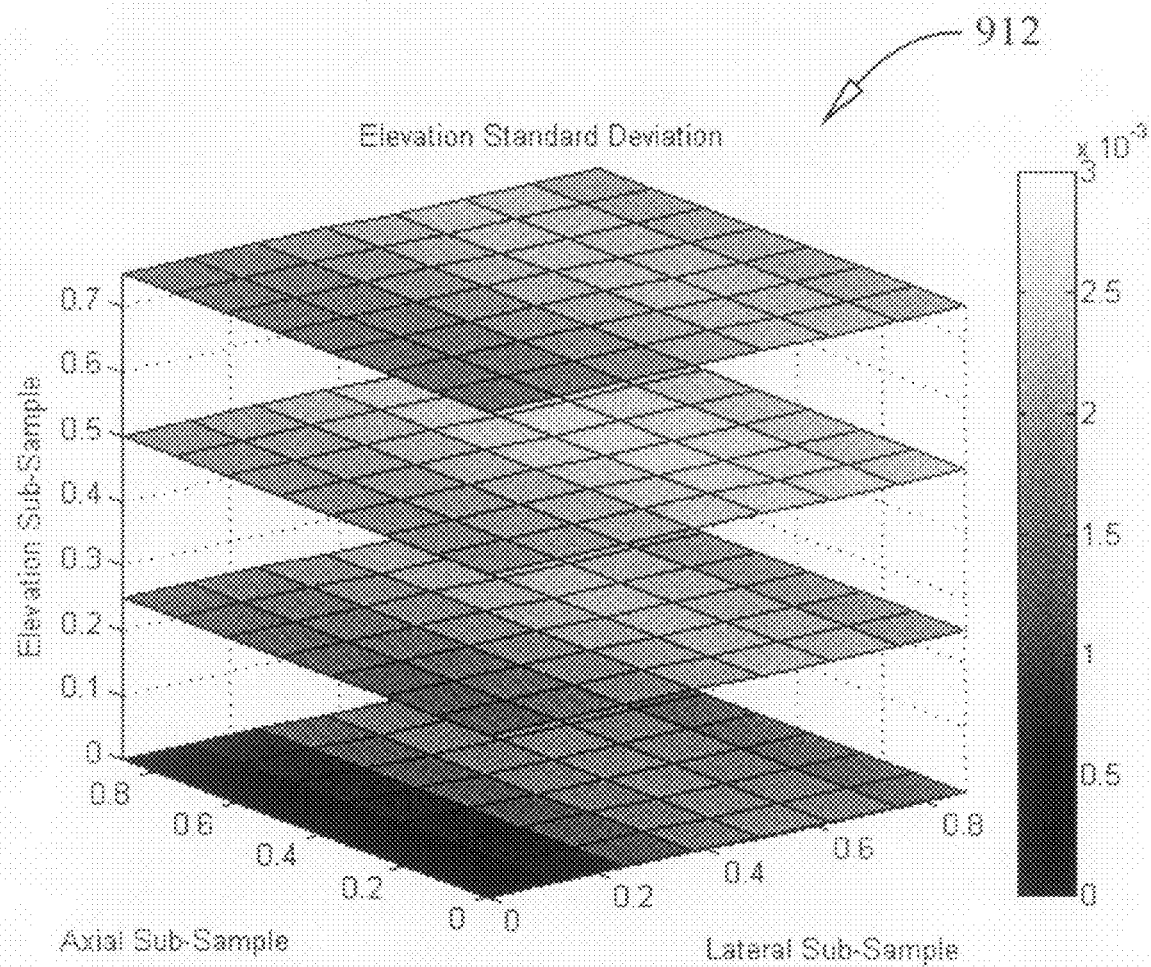

Simulation results are shown in FIGS. 11, 12, and 13, when using the methods of the present invention, when using the SSD algorithm with parabolic sub-sample estimation, and when using the SAD algorithm with parabolic sub-sample estimation, respectively. For each of FIGS. 11-13, axial bias (602, 702 and 802, respectively), lateral bias (604, 704 and 804, respectively), axial standard deviation (606, 706 and 806, respectively), and lateral standard deviation (608, 708 and 808, respectively), are depicted for the displacement (motion) estimates.

Figure 10:
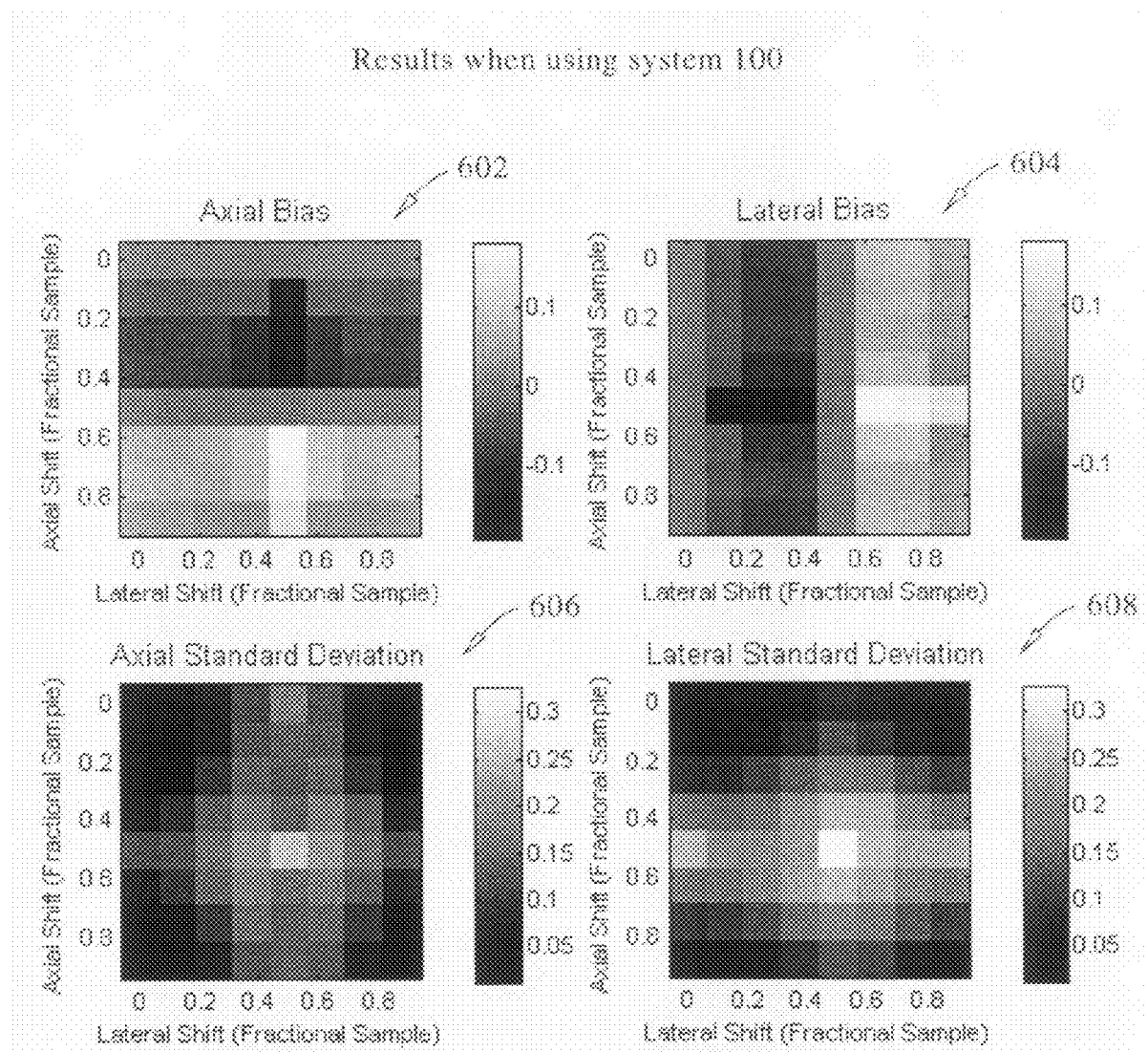
FIG. 10 shows simulation results of an example using an embodiment of the present invention.

FIG. 10 shows that the simulation results for use of the present invention resulted in a maximum axial bias 602 of less than $2.5 \times 10^{-4}$ samples, which at the simulated sampling rate of 40 MHz corresponds to 4.8 nm, whereas the lateral bias 604 was on the order of $2.2 \times 10^{-3}$ samples, corresponding to 297 nm (the lateral sampling interval was set to 135 um). The standard deviation of displacement estimates 606, 608 in both dimensions was on the order of $2.8 \times 10^{-3}$ samples, or 54 nm axially and 378 nm laterally. The bars adjacent 602, 604, 606 and 608 show the estimation errors in two-dimensions in units of the distance between two consecutive samples.

FIG. 11 shows that the simulation results for use of the SSD with parabolic sub-sample estimation showed axial 702 and lateral 704 biases were comparable to each other, and on the order of 0.14 samples. The standard deviations 706, 708 in both dimensions were on the order of 0.27 samples, corresponding to 5.2 um axially and 36 um laterally. Similar results are depicted in FIG. 12 for the simulation results when using SAD with parabolic sub-sample estimation. The bias 802, 804 and standard deviation 806, 808 of estimates were slightly worse than that observed for the SSD with parabolic sub-sample estimation.

FIGS. 10 through 12 show the simulated bias and standard deviation from use of an embodiment of the present invention, use of an existing system employing SSD, and use of an existing system employing SAD, respectively. Both SSD and SAD methods were coupled with parabolic fitting to estimate sub-sample shifts. These alternative algorithms were chosen since they represent methods commonly used to track 2D motion in ultrasound applications. The results presented in these figures show that the results from use of an embodiment of the present invention showed bias in the axial dimension 602 that was a factor of 540 lower than that of SSD 702 and a factor of 700 lower than SAD 802. In the lateral dimension the results from use of an embodiment of the present invention 604 outperformed the other two methods 704, 804 by roughly a factor of 70.

The standard deviation results 606, 608 were between 80 and 90 times smaller than those of either SSD 706, 708 or SAD 806, 808 in both lateral and axial directions.

Example 2

3D Simulations

Computer simulations were performed to quantify the bias and variance of a 3D embodiment of the present invention. Simulation methods were the same of those described above in Example 1 for the 2D case. Simulated speckle patterns were generated by convolving a 3D psf with a volume of Gaussian amplitude distributed random scatterers. In this case, the psf in the elevation direction was modeled as a Nuttall window 1.2 mm wide. A total of 1,000 unique speckle patterns were generated and sampled at 320 MHz temporally and a 16.875 um both laterally and in elevation. The datasets were then trimmed and sub-sampled along the three directions to generate reference and delayed volumes with a known sub-sample shift.

FIG. 13 shows results summarization of the 3D simulations. In FIG. 13, every other plane in the elevation direction was eliminated prior to display to provide better and clearer visualization of the remaining data. Axial bias and standard deviation in the axial dimension are shown at 902 and 904, respectively. These two slice plots indicate a maximum bias of $3 \times 10^{-4}$ samples and maximum standard deviation of $3 \times 10^{-3}$, corresponding to 5.7 nm and 57 nm respectively. Bias and standard deviation in the lateral dimension are shown at 906 and 908, respectively. As expected, the lateral bias oscillated in the direction of the lateral sub-sample shift. In this case the bias and standard deviation corresponded to 290 nm and 378 nm, respectively (i.e., $2.1 \times 10^{-3}$ samples for the bias and $2.8 \times 10^{-3}$ samples for the standard deviation). Bias and standard deviation in the elevation dimension are shown at 910 and 912, respectively. In this case bias varies along the elevation sub-sample shift, as evidenced by the different grayscale of the four slices. The maximum bias and standard deviation along this direction were $2.3 \times 10^{-3}$ and $2.5 \times 10^{-3}$, corresponding to 310 nm and 337 nm, respectively.

In regard to the results shown in FIG. 13, the bias 902, 906, 910 and standard deviation 904, 908, 912 of the estimates were similar to those observed in FIG. 10 for 2D motion. The bars adjacent 902, 904, 906, 908, 910 and 912 show the estimation errors in three-dimensions in units of the distance between two consecutive samples.

Example 3

Experimental Performance

Experiments were performed to test the performance of the present invention. Displaced sets of RF echo data were acquired using an MM3000 mechanical translation stage (Newport Corporation, Mountain View, Calif.) with a stated precision of 0.1 um. RF data was acquired at 2.4 um intervals in range and 37.5 um intervals in azimuth. The transducer was mounted to a 1 inch thick Plexiglas plate using nylon cable ties. A two axis tilt and rotation stage (M37 with micrometers, Newport Corporation) was also employed to align the transducer to the movement of the motion stage so as to keep the image plane parallel to the translation plane. The calibration procedure is described in detail below.

Full RF image frames were acquired over a 9×9 grid of positions from a 10% polyacrylamide tissue mimicking gel phantom with 50 um Sephadex® beads (Amersham, Piscataway, N.J.) added as acoustic scattering agent. Echo data was obtained from an Ultrasonix Sonix RP imaging system (Ultrasonix Medical Corporation, Richmond, BC, Canada) with a L14-5/38 linear array transducer. The system was configured to perform dynamic receive focusing with aperture sizes selected to yield a 900 um beamwidth. At a lateral line sampling of 300 um, these settings yielded a lateral sampling interval of approximately ⅓ the beamwidth. Although this beam dimension was much coarser than would be expected for most clinical imagers, it did yield a beam spacing with fractional beamwidth close to that of the simulations.

Signals were sampled temporally at 40 MHz. The sample shifts corresponding to the ultrasound transducer specifications were 19.25 um/axial sample and 300 um/lateral sample. Calibration of the alignment system was performed using correlation coefficients obtained before and after lateral and axial translations of 10 samples in each direction. The correlation was computed over a 65 lateral by 400 axial sample region after accounting for the sample shift movement so as to compute the correlation on the same region of the phantom at each location. The axial correlation was maximized to 0.99435 after 10 sample shifts, while the lateral correlation was maximized to 0.97683 after 10 sample shifts. The discrepancy between these correlations indicated that even with meticulous data acquisition, out of plane motion, not electronic noise, remains the limit on performance.

Prior to processing, received data was bandpass filtered using a $100^{th}$ order FIR filter with cutoffs at 4.5 and 8.5 MHz. The embodiment of the present invention utilized in this experiment utilized reference regions of 105 samples axially by 7 samples laterally, and displaced image regions of 79 samples axially by 5 samples laterally, corresponding to an area of 1.5 mm by 1.5 mm. Six unique speckle patterns and 60 different noise realizations were processed at each displacement, for a total of 360 trials for each of the 81 displacements.

Figure 14:
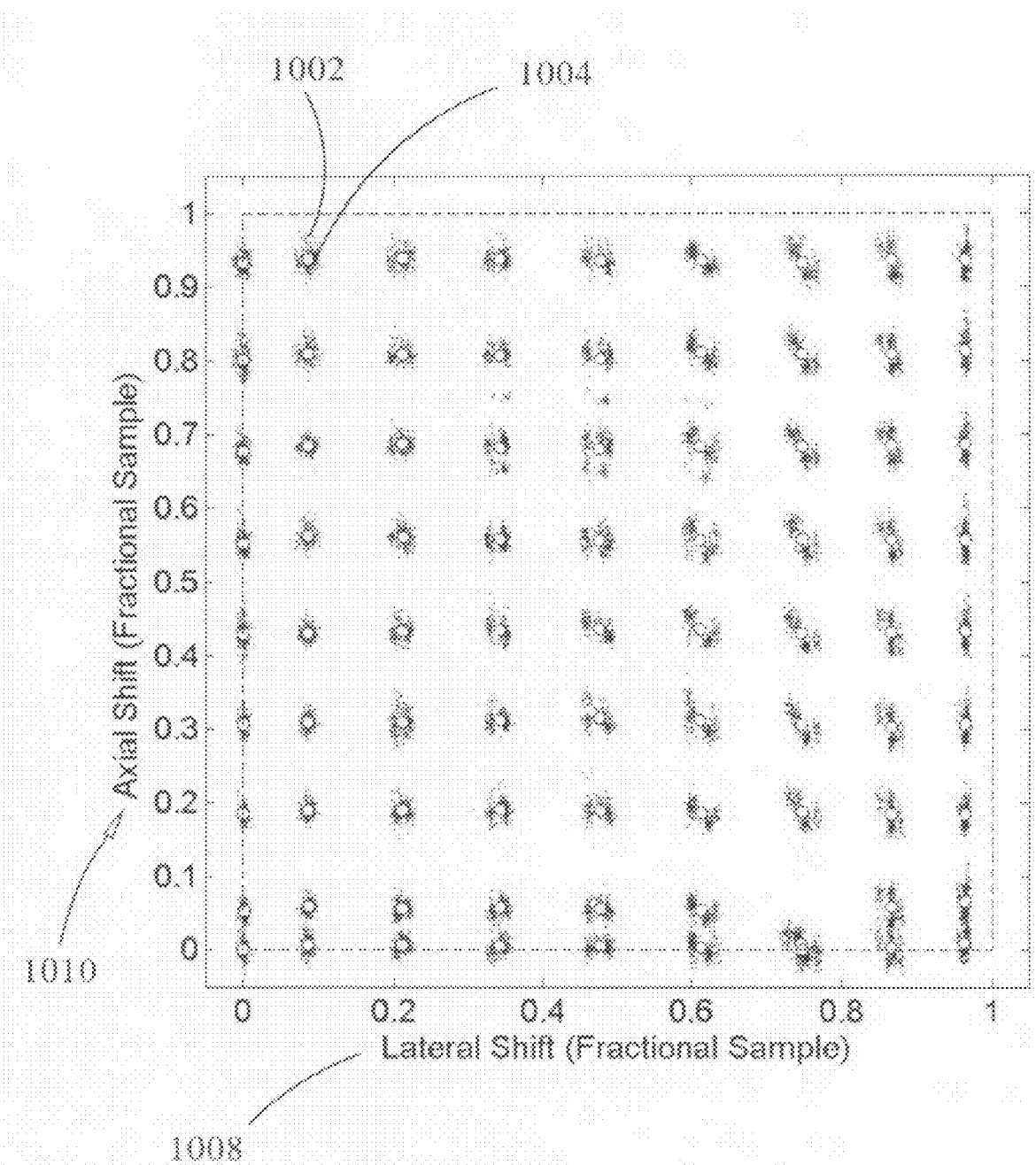
FIG. 14 depicts displacement estimates performed by applying an embodiment of the present invention to experimentally acquire and process speckle data.
Figures 15, 16A, 16B:
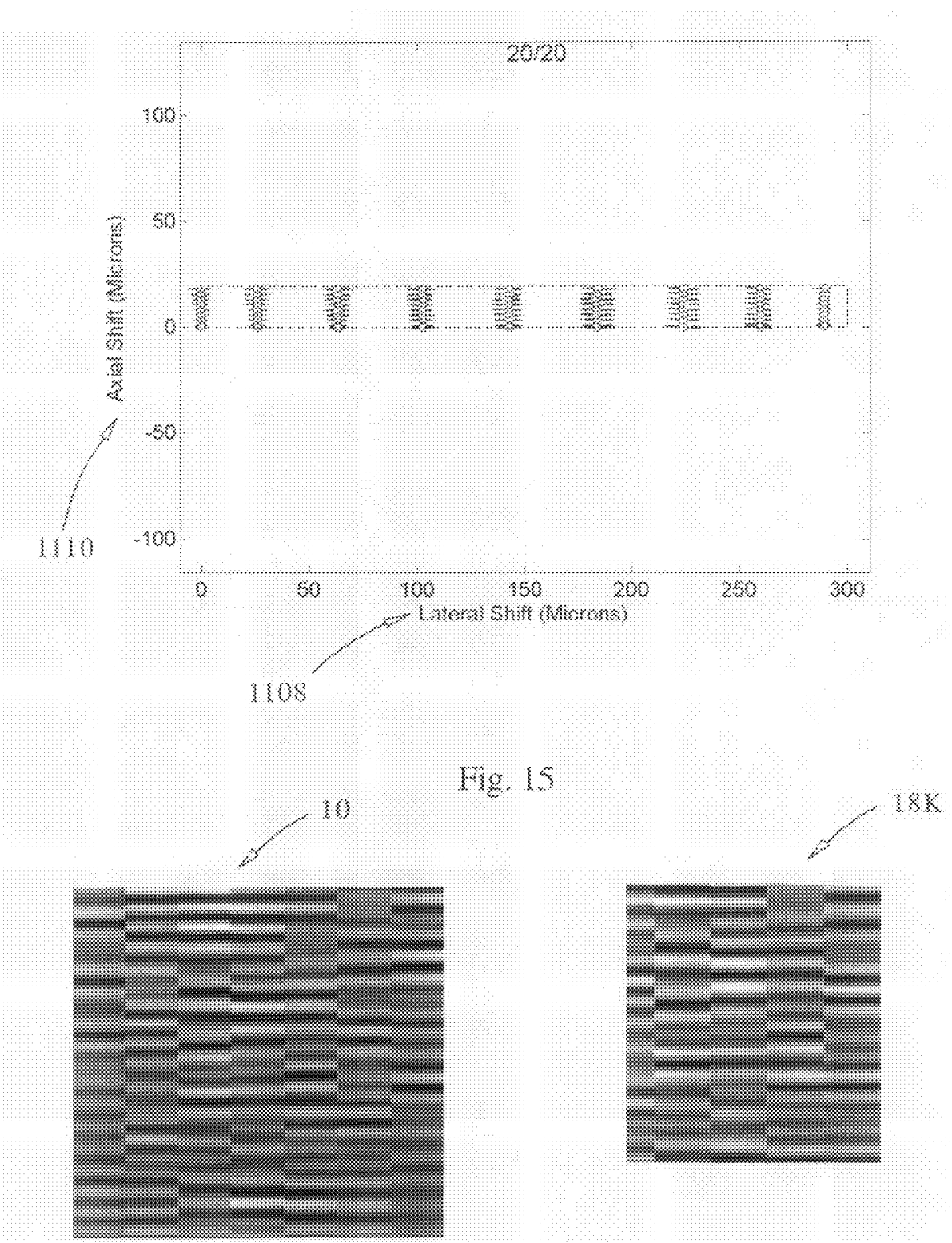
FIG. 15 depicts the displacement estimates from FIG. 14, but lateral shift (displacement) and axial shift (displacement) are given in units of distance, rather than as fractions of a sample.
FIG. 16A shows an example of a two-dimensional reference region.
FIG. 16B shows an example of a two-dimensional region of interest from a from a displaced dataset.

FIG. 14 depicts displacement estimates performed by applying the present invention in the manner described above to experimentally acquire and process speckle data. Each dot 1002 (the dots 1002 form the clouds around the open circles 1004) represents one displacement estimate while the open circles 1004 represent the mean estimate at each displacement. Lateral displacement estimates 1008 were roughly ⅛ sample, as intended by the 37.5 um programmed displacements. Axial displacement (i.e., axial shift) estimates 1010 were approximately ⅛ sample, as would be expected for this speed of sound (i.e., 1540 m/s). The standard deviation of displacement estimates were on the order of $13.5 \times 10^{-3}$ samples axially and $8.6 \times 10^{-3}$ samples laterally (i.e., 0.26 um axially and 2.66 um laterally). FIG. 15 depicts the displacement estimates from FIG. 14, but lateral shift (displacement) 1108 and axial shift (displacement) 1110 are given in units of distance, rather than as fractions of a sample. FIG. 16A shows a typical two-dimensional reference region 10 while FIG. 16B shows a typical two-dimensional region of interest 12s from the displaced dataset 12, wherein the comparison data was obtained from the acrylamide phantom.

In the experimental performance results shown in FIGS. 15 and 16, the standard deviations of the estimates in both the lateral and axial dimensions were larger than those obtained in simulations. In the axial dimension the standard deviation, in terms of samples, was increased by a factor of 4.9 whereas in the lateral dimension by a factor of 3.2. However, these experimental values were still significantly smaller than the standard deviations observed in simulations for both the SSD and SAD. The observed displacement errors in the experimental results were thought to be due to the combination of the limited accuracy of the motion stage, electronic noise, and alignment between image and translation planes (i.e., out of plane motion). Furthermore, in the case of the axial standard deviation, it was thought that the weight of the Plexiglas plate could have caused slipping in the servo-based translation stage, introducing bias in the applied displacements. It is also noted that the transducer aperture was intentionally set to generate a 900 um beam, which is much larger than that observed in typical, low F-number ultrasound imaging systems, and it is expected that both the bias and the standard deviation of the estimates will significantly improve with improved lateral resolution.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of estimating changes in an object represented by first and second multidimensional datasets, where the first dataset is a reference dataset and the second dataset is an altered dataset, the method comprising:
   processing discrete data samples of the first dataset to form a piecewise continuous representation thereof;
   computing an error function for comparisons between discrete data samples in the second dataset and the piecewise continuous representation of the first dataset;
   determining an alteration of the second dataset relative to the first dataset that minimizes the error function; and
   performing at least one of storing or outputting parameters of the alteration.

2. The method of claim 1, wherein the error function is an analytical error function.

3. The method of claim 1, wherein the discrete data samples comprise data vectors, each data vector including a plurality of data values.

4. The method of claim 1, wherein the processing discrete data samples of the reference dataset to form a continuous representation thereof comprises forming a multi-dimensional spline representation of the reference dataset.

5. The method of claim 4, wherein the processing discrete data samples of the reference dataset to form a continuous representation thereof comprises forming a non-separable, multidimensional spline representation of the reference dataset.

6. The method of claim 4, comprising formulating the multidimensional spline representation from a series of one-dimensional splines.

7. The method of claim 4, wherein at least one highest order term of a polynomial representing the multi-dimensional spline is set to a zero value.

8. The method of claim 1, wherein the error function comprises a sum-squared error function.

9. The method of claim 1, wherein said determining an alteration of the second dataset relative to the first dataset that minimizes the error function comprises use of a generalized companion matrix.

10. The method of claim 1, wherein the alteration is a local alteration estimate for a particular overlap orientation between a subset of discrete data samples in the second dataset and a subset of the piecewise continuous representation, said method further comprising:
    computing the error function for all possible overlap orientations between the subset of discrete data samples in the second dataset and the subset of the piecewise continuous representation of the first dataset; and
    identifying an overall minimum from the respective minima of all error functions computed, wherein said overall minimum is representative of a global alteration.

11. The method of claim 1, wherein the alteration is a local alteration estimate for a particular overlap orientation between a subset of discrete data samples in the second dataset and a subset of the piecewise continuous representation, said method further comprising:
    computing the error function for a subset of all possible overlap orientations between the subset of discrete data samples in the second dataset and the subset of the piecewise continuous representation of the first dataset; and
    identifying an overall minimum from the respective minima of all error functions computed, wherein said overall minimum is representative of a global alteration.

12. The method of claim 1, wherein the alteration estimates rigid-body motion of the object.

13. The method of claim 1, wherein the alteration estimates at least one of compression and stretching of the object.

14. The method of claim 1, wherein the alteration estimates shearing of the object.

15. The method of claim 1, wherein said outputting comprises displaying an image indicating estimated alterations of the object.

16. The method of claim 1, wherein the samples of the first and second datasets comprise data values of ultrasonic signals measured by an ultrasonic imaging apparatus.

17. The method of claim 1, further comprising normalizing to provide the same scaling for the discrete data samples of the first and second datasets prior to the forming of the piecewise continuous representation.

18. A method of estimating motion of an object represented by first and second multidimensional datasets, where the first dataset is a reference dataset and the second dataset is a delayed dataset, said method comprising:
    processing discrete data values of the first dataset to form a piecewise continuous representation thereof;
    selecting a region of interest from the delayed dataset;
    selecting a region of interest from the piecewise continuous representation;
    performing a plurality of overlap positionings of the selected region of interest of the delayed dataset on the selected region of interest of the piecewise continuous representation, wherein each overlap comprise a different position of said region of interest from the delayed dataset relative to said region of interest from said piecewise continuous dataset;
    generating an error function for each overlap positioning;
    calculating a minimum of the error function; and
    performing at least one of storing or outputting a location of the minimum.

19. A system for estimating alteration between first and second multidimensional datasets, where the first dataset is a reference dataset and the second dataset is an altered dataset, said system comprising:
    an alteration estimation module comprising at least one processor and programming configured to process discrete data samples of the first dataset to form a piecewise continuous representation thereof; select a region of interest from the altered dataset; select a region of interest from the piecewise continuous representation, perform overlap positioning of the selected region of interest from the altered dataset on the region of interest of the piecewise continuous representation; generate an error function for each overlap positioning; and calculate a minimum of the error function; and means for outputting at least one value calculated by said alteration estimation module.

20. The system of claim 19, further comprising an imaging system.

21. The system of claim 20, wherein said imaging system comprises an ultrasonic imager.

22. A computer readable medium carrying one or more sequences of instructions for estimating alteration represented by first and second multidimensional datasets, wherein execution of one or more sequences of instructions by one or more processors causes the one or more processors to perform the steps of:

processing discrete data samples of the first dataset to form a piecewise continuous representation thereof;

selecting a region of interest from the second dataset;

selecting a region of interest from the piecewise continuous representation;

performing overlap positioning of the selected region of interest from the second dataset on the region of interest from the piecewise continuous representation;

generating an error function for each overlap positioning; and calculating a minimum of the error function.

* * * * *